United States Patent
Kanamarlapudi et al.

(10) Patent No.: US 12,532,312 B2
(45) Date of Patent: Jan. 20, 2026

(54) TRANSMISSION CONTROL PROTOCOL ACKNOWLEDGEMENT SHAPING

(71) Applicant: QUALCOMM Incorporated, San Diego, CA (US)

(72) Inventors: Sitaramanjaneyulu Kanamarlapudi, San Diego, CA (US); Vamsi Dokku, San Diego, CA (US); Arnaud Meylan, San Diego, CA (US); Alok Mitra, San Diego, CA (US); Yubing Jian, San Diego, CA (US); Subash Abhinov Kasiviswanathan, Erie, CO (US)

(73) Assignee: Qualcomm Incorporated, San Diego, CA (US)

( * ) Notice: Subject to any disclaimer, the term of this patent is extended or adjusted under 35 U.S.C. 154(b) by 613 days.

(21) Appl. No.: 17/834,186

(22) Filed: Jun. 7, 2022

(65) Prior Publication Data

US 2023/0397192 A1 Dec. 7, 2023

(51) Int. Cl.
*H04W 72/1268* (2023.01)
*H04L 5/00* (2006.01)
*H04W 72/23* (2023.01)
*H04W 80/06* (2009.01)

(52) U.S. Cl.
CPC ....... *H04W 72/1268* (2013.01); *H04L 5/0053* (2013.01); *H04W 72/23* (2023.01); *H04W 80/06* (2013.01)

(58) Field of Classification Search
CPC .............................................. H04W 72/1268
See application file for complete search history.

(56) References Cited

U.S. PATENT DOCUMENTS

| 11,909,644 B2 * | 2/2024 | Mindler | ................ H04W 40/36 |
| 2007/0286077 A1 | 12/2007 | Wu | |
| 2017/0134293 A1 * | 5/2017 | Williams | ................ H04L 47/40 |

(Continued)

FOREIGN PATENT DOCUMENTS

| EP | 3404897 A1 | 11/2018 |
| EP | 3890431 A2 | 10/2021 |
| WO | WO-2008140231 A1 | 11/2008 |

OTHER PUBLICATIONS

Partial International Search Report—PCT/US2023/067705—ISA/EPO—Sep. 1, 2023 (2202240WO).

(Continued)

*Primary Examiner* — Abdeltif Ajid
(74) *Attorney, Agent, or Firm* — Holland & Hart LLP

(57) ABSTRACT

Methods, systems, and devices for wireless communications are described. A user equipment (UE) may generate and transmit at least one TCP ACK message according to a delay timer. A duration for the delay timer may be based on a downlink data pattern associated with downlink data packets for the UE and an uplink scheduling pattern associated with uplink data packets for the UE. The UE may generate and transmit multiple TCP ACK message segments corresponding to the TCP ACK message based on the downlink data pattern and the uplink scheduling pattern. A TCP ACK message segment may correspond to feedback for a respective portion of the quantity of data. The UE may generate and transmit a TCP ACK message associated with the quantity of data based on a transmission blanking pattern.

16 Claims, 12 Drawing Sheets

(56) References Cited

U.S. PATENT DOCUMENTS

| | | | | |
|---|---|---|---|---|
| 2019/0319889 A1* | 10/2019 | Zhang | ............ | H04W 28/06 |
| 2021/0067452 A1* | 3/2021 | Ramachandran | ..... | H04L 69/168 |
| 2021/0307110 A1* | 9/2021 | Ramalingam | ........ | H04W 72/21 |
| 2021/0409158 A1* | 12/2021 | Kanamarlapudi | .... | H04L 1/1841 |

OTHER PUBLICATIONS

International Search Report and Written Opinion—PCT/US2023/067705—ISA/EPO—Jan. 31, 2024 (2202240WO).

* cited by examiner

TRANSMISSION CONTROL PROTOCOL ACKNOWLEDGEMENT SHAPING

FIELD OF TECHNOLOGY

The following relates to wireless communications, including transmission control protocol (TCP) acknowledgement (ACK) shaping.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE). Some wireless communications systems may support packet-based communications.

SUMMARY

The described techniques relate to improved methods, systems, devices, and apparatuses that support transmission control protocol (TCP) acknowledgement (ACK) shaping. For example, the described techniques provide a framework for generating TCP ACK messages based on characteristics associated with downlink communications and uplink communications between a user equipment (UE) and a wireless communications network. In some examples, the UE may generate and transmit at least one TCP ACK message according to a delay timer (e.g., the UE may delay transmission of a TCP ACK until after expiration of the delay timer). A duration for the delay timer may be based on a downlink data pattern associated with downlink data packets for the UE and an uplink scheduling pattern associated with uplink data packets for the UE.

In other examples, the UE may receive a downlink data packet including a quantity (e.g., an amount) of data. The downlink data packet may be associated with a TCP ACK message. The UE may generate multiple TCP ACK message segments corresponding to the TCP ACK message based on the downlink data pattern and the uplink scheduling pattern. The UE may transmit the multiple TCP ACK message segments where each TCP ACK message segment corresponds to feedback for a respective portion of the quantity of data. In other examples, the UE may generate and transmit at least one TCP ACK message associated with the quantity of data based on a transmission blanking pattern. The transmission blanking pattern may indicate one or more time intervals associated with refrainment of TCP ACK message transmission at the UE. The size of the at least one TCP ACK message may be based on the transmission blanking pattern. Such techniques may lead to reduced latency and increased performance of wireless communications between the UE and the wireless communications network, among other possible benefits.

A method for wireless communication at a UE is described. The method may include generating at least one TCP ACK message in accordance with a delay timer and based on a threshold ACK size for TCP ACK messages and transmitting the at least one TCP ACK message based on the generating.

An apparatus for wireless communication at a UE is described. The apparatus may include a processor, memory coupled with the processor, and one or more instructions stored in the memory. The one or more instructions may be executable by the processor to cause the apparatus to, based on the one or more instructions, generate at least one TCP ACK message in accordance with a delay timer and based on a threshold ACK size for TCP ACK messages and transmit the at least one TCP ACK message based on the generating.

Another apparatus for wireless communication at a UE is described. The apparatus may include means for generating at least one TCP ACK message in accordance with a delay timer and based on a threshold ACK size for TCP ACK messages and means for transmitting the at least one TCP ACK message based on the generating.

A non-transitory computer-readable medium storing code for wireless communication at a UE is described. The code may include instructions executable by a processor to generate at least one TCP ACK message in accordance with a delay timer and based on a threshold ACK size for TCP ACK messages and transmit the at least one TCP ACK message based on the generating.

In some examples of the method, apparatuses, and non-transitory computer-readable medium described herein, a duration for the delay timer may be based on a downlink data pattern associated with downlink data packets for the UE and an uplink scheduling pattern associated with uplink data packets for the UE.

In some examples of the method, apparatuses, and non-transitory computer-readable medium described herein, generating the at least one TCP ACK message in accordance with the delay timer may include operations, features, means, or instructions for generating the at least one TCP ACK message in response to an expiration of a duration for the delay timer, where the at least one TCP ACK message may be transmitted after the expiration of the duration of the delay timer.

In some examples of the method, apparatuses, and non-transitory computer-readable medium described herein, generating the at least one TCP ACK message in accordance with the delay timer may include operations, features, means, or instructions for generating the at least one TCP ACK message based on a quantity of TCP ACK messages in a buffer of the UE.

Some examples of the method, apparatuses, and non-transitory computer-readable medium described herein may further include operations, features, means, or instructions for determining a duration for the delay timer based on a round trip time (RTT) associated with a TCP at the UE, a time duration for receiving data packets at the UE, a delay ACK timer associated with transmitting the at least one TCP ACK message, a quantity of data associated with the at least one TCP ACK message, one or more TCP parameters associated with the TCP at the UE, or a processing time associated the at least one TCP ACK message, or any combination thereof.

A method for wireless communication at a UE is described. The method may include receiving a first data packet including a first quantity of data and a second data packet including a second quantity of data, the first data packet associated with a first TCP ACK message and the second data packet associated with a second TCP ACK message, generating a set of multiple TCP ACK message segments corresponding to the first TCP ACK message and the second TCP ACK message based on a threshold ACK size for TCP ACK message segments, where the set of multiple TCP ACK message segments correspond to feedback for the first quantity of data and the second quantity of data, and transmitting the set of multiple TCP ACK message segments based on the generating.

An apparatus for wireless communication at a UE is described. The apparatus may include a processor, memory coupled with the processor, and one or more instructions stored in the memory. The one or more instructions may be executable by the processor to cause the apparatus to, based on the one or more instructions, receive a first data packet including a first quantity of data and a second data packet including a second quantity of data, the first data packet associated with a first TCP ACK message and the second data packet associated with a second TCP ACK message, generate a set of multiple TCP ACK message segments corresponding to the first TCP ACK message and the second TCP ACK message based on a threshold ACK size for TCP ACK message segments, where the set of multiple TCP ACK message segments correspond to feedback for the first quantity of data and the second quantity of data, and transmit the set of multiple TCP ACK message segments based on the generating.

Another apparatus for wireless communication at a UE is described. The apparatus may include means for receiving a first data packet including a first quantity of data and a second data packet including a second quantity of data, the first data packet associated with a first TCP ACK message and the second data packet associated with a second TCP ACK message, means for generating a set of multiple TCP ACK message segments corresponding to the first TCP ACK message and the second TCP ACK message based on a threshold ACK size for TCP ACK message segments, where the set of multiple TCP ACK message segments correspond to feedback for the first quantity of data and the second quantity of data, and means for transmitting the set of multiple TCP ACK message segments based on the generating.

A non-transitory computer-readable medium storing code for wireless communication at a UE is described. The code may include instructions executable by a processor to receive a first data packet including a first quantity of data and a second data packet including a second quantity of data, the first data packet associated with a first TCP ACK message and the second data packet associated with a second TCP ACK message, generate a set of multiple TCP ACK message segments corresponding to the first TCP ACK message and the second TCP ACK message based on a threshold ACK size for TCP ACK message segments, where the set of multiple TCP ACK message segments correspond to feedback for the first quantity of data and the second quantity of data, and transmit the set of multiple TCP ACK message segments based on the generating.

In some examples of the method, apparatuses, and non-transitory computer-readable medium described herein, a TCP ACK message segment of the set of multiple TCP ACK message segments corresponds to feedback for a respective portion of a third quantity of data including the first quantity of data and the second quantity of data.

In some examples of the method, apparatuses, and non-transitory computer-readable medium described herein, the first TCP ACK message and the second TCP ACK message include selective ACK message.

In some examples of the method, apparatuses, and non-transitory computer-readable medium described herein, a first set of TCP ACK message segment of the set of multiple TCP ACK message segments corresponds to feedback for a respective portion of the first quantity of data and a second set of TCP ACK message segments of the set of multiple TCP ACK message segments corresponds to feedback for a respective portion of the second quantity of data.

Some examples of the method, apparatuses, and non-transitory computer-readable medium described herein may further include operations, features, means, or instructions for generating the set of multiple TCP ACK message segments may be further based on a downlink data pattern associated with downlink data packets for the UE and an uplink scheduling pattern associated with uplink data packets for the UE.

Some examples of the method, apparatuses, and non-transitory computer-readable medium described herein may further include operations, features, means, or instructions for updating one or more parameters associated with the first data packet and the second data packet based on generating the set of multiple TCP ACK message segments, where transmitting the set of multiple TCP ACK message segments may be based on the updating.

In some examples of the method, apparatuses, and non-transitory computer-readable medium described herein, generating the set of multiple TCP ACK message segments may include operations, features, means, or instructions for generating the set of multiple TCP ACK message segments based on a radio access technology (RAT) associated with the UE, a throughput associated with downlink data packets for the UE, a time associated with layer two window management, or a discontinuous reception mode associated with the UE, or any combination thereof.

In some examples of the method, apparatuses, and non-transitory computer-readable medium described herein, generating the set of multiple TCP ACK message segments may include operations, features, means, or instructions for generating the set of multiple TCP ACK message segments based on a quantity of data streams associated with downlink data packets for the UE, a quantity of data streams associated with uplink data packets for the UE, one or more TCP parameters associated with a TCP at the UE, a transmit power associated with uplink data packets for the UE, or an uplink grant pattern associated with uplink data packets for the UE, or any combination thereof.

In some examples of the method, apparatuses, and non-transitory computer-readable medium described herein, generating the set of multiple TCP ACK message segments may include operations, features, means, or instructions for generating the set of multiple TCP ACK message segments based on an RTT associated with downlink data packets and uplink data packets for the UE, a packet delay budget (PDB) associated with downlink data packets for the UE, a PDB associated with uplink data packets for the UE, a quality of service (QOS) associated with downlink data packets for the UE, a QOS associated with uplink data packets for the UE, a traffic type associated with downlink data packets for the UE, or a traffic type associated with uplink data packets for the UE, or any combination thereof.

A method for wireless communication at a UE is described. The method may include generating at least one TCP ACK message associated with a quantity of data based on a transmission blanking pattern that indicates one or more time intervals associated with refrainment of transmission of TCP ACK messages, where a size of the at least one TCP ACK message is based on the transmission blanking pattern and transmitting, based on the generating, the at least one TCP ACK message in accordance with the transmission blanking pattern.

An apparatus for wireless communication at a UE is described. The apparatus may include a processor, memory coupled with the processor, and one or more instructions stored in the memory. The one or more instructions may be executable by the processor to cause the apparatus to, based on the one or more instructions, generate at least one TCP ACK message associated with a quantity of data based on a transmission blanking pattern that indicates one or more time intervals associated with refrainment of transmission of TCP ACK messages, where a size of the at least one TCP ACK message is based on the transmission blanking pattern and transmit, based on the generating, the at least one TCP ACK message in accordance with the transmission blanking pattern.

Another apparatus for wireless communication at a UE is described. The apparatus may include means for generating at least one TCP ACK message associated with a quantity of data based on a transmission blanking pattern that indicates one or more time intervals associated with refrainment of transmission of TCP ACK messages, where a size of the at least one TCP ACK message is based on the transmission blanking pattern and means for transmitting, based on the generating, the at least one TCP ACK message in accordance with the transmission blanking pattern.

A non-transitory computer-readable medium storing code for wireless communication at a UE is described. The code may include instructions executable by a processor to generate at least one TCP ACK message associated with a quantity of data based on a transmission blanking pattern that indicates one or more time intervals associated with refrainment of transmission of TCP ACK messages, where a size of the at least one TCP ACK message is based on the transmission blanking pattern and transmit, based on the generating, the at least one TCP ACK message in accordance with the transmission blanking pattern.

Some examples of the method, apparatuses, and non-transitory computer-readable medium described herein may further include operations, features, means, or instructions for receiving a data packet including the quantity of data over a time interval of the one or more time intervals associated with refrainment of transmission of TCP ACK messages, where generating the at least one TCP ACK message may be based on the time interval lapsing.

Some examples of the method, apparatuses, and non-transitory computer-readable medium described herein may further include operations, features, means, or instructions for receiving a data packet in response to the at least one TCP ACK message, where the data packet includes a second quantity of data, and where the second quantity of data may be based on the size of the at least one TCP ACK message.

In some examples of the method, apparatuses, and non-transitory computer-readable medium described herein, the size of the at least one TCP ACK message may be further based on a quantity of TCP ACK messages being buffered at the UE, a machine performance rating associated with the UE, a transmit power associated with uplink data packets for the UE, a quantity of available bandwidth in an uplink direction, a throughput associated with downlink data packets for the UE, or a burst associated with the downlink data packets for the UE, or any combination thereof.

In some examples of the method, apparatuses, and non-transitory computer-readable medium described herein, the one or more time intervals may be periodic or aperiodic.

In some examples of the method, apparatuses, and non-transitory computer-readable medium described herein, the transmission blanking pattern may be based on interference internal to the UE, interference external to the UE, coordinated interference, or informed interference, or any combination thereof.

DETAILED DESCRIPTION

Figure 1:
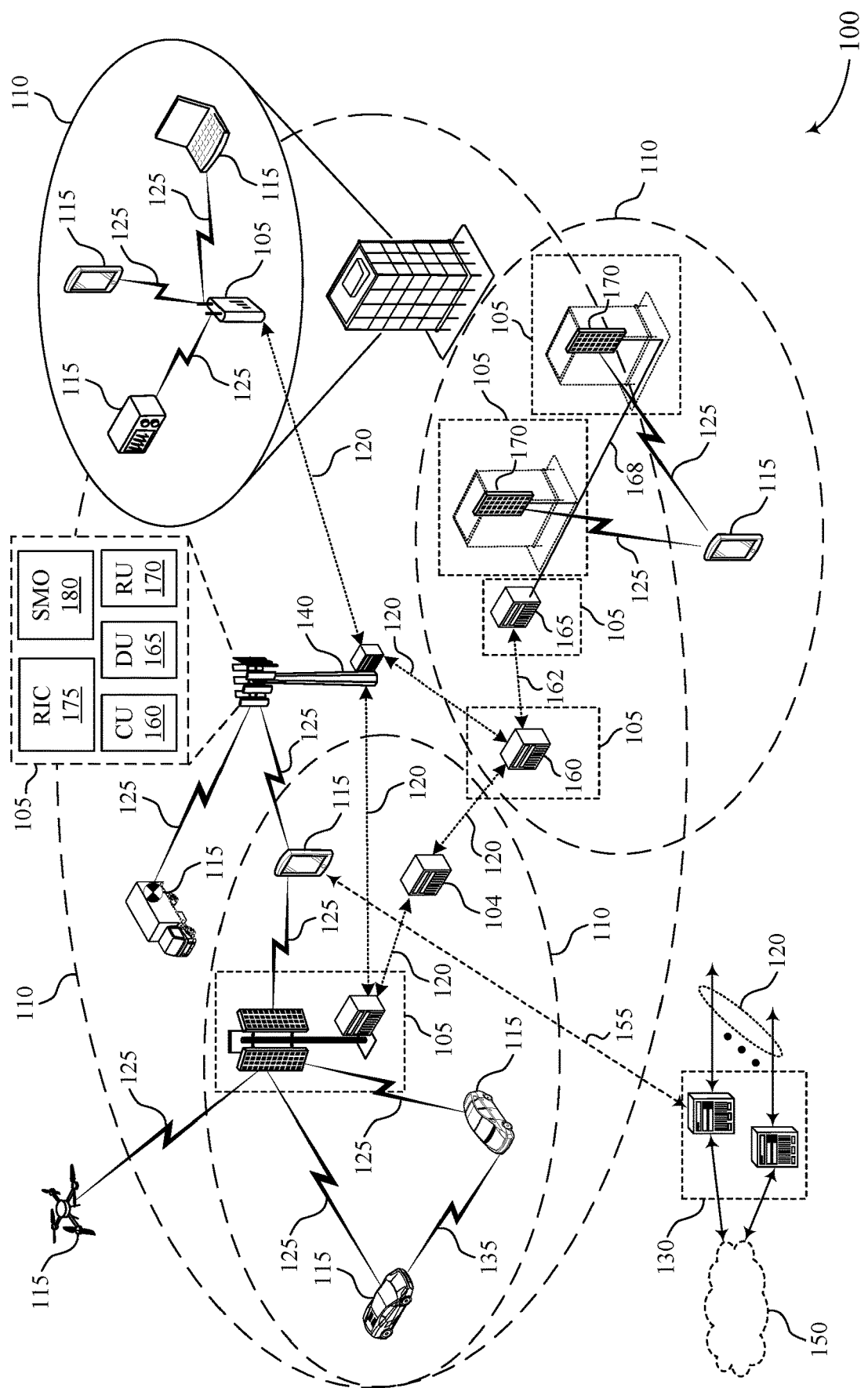
FIGS. 1 and 2 each illustrate an example of a wireless communications system that supports transmission control protocol (TCP) acknowledgement (ACK) shaping in accordance with one or more aspects of the present disclosure.

Some wireless communications systems may support packet-based communications. For example, a user plane entity of a radio access network (RAN) may be connected with an Internet Protocol (IP) service. The IP service may provide the RAN access to a packet-switched network, such as the Internet. The user plane entity may transfer data packets from one or more servers connected with the packet-switched network to communication devices within the RAN, such as one or more user equipments (UEs). In some examples, the user plane entity of the RAN may transfer data packets between the one or more servers and the communication devices (e.g., one or more UEs) via one or more network entities. The servers may be referred to as far-end or remote servers, and may represent examples of internet servers, databases, or other servers. A network connection between a UE and a server via a RAN (e.g., and via a packet-switched network) may be established and maintained using a transmission control protocol (TCP). In some examples, the UE, or other communication devices in the RAN may be referred to as a data receiver for a transport protocol, and the server may be referred to as a data transmitter for the transport protocol. The data receiver for the transfer protocol (e.g., the UE) may transmit TCP acknowledgement (ACK) messages to the data transmitter (e.g., the server) in response to successfully receiving one or multiple data packets (e.g., via the RAN). In some examples, the server may refrain from transmitting subsequent (e.g., additional) data packets until the server receives the TCP ACK message for one or multiple previously transmitted packets. Additionally, or alternatively, a quantity of data (e.g., a data packet of a particular size) capable of being sent to the UE (e.g., from the server) at a time instance may be fixed. As such, communications between the UE and the server may experience increased latency if, for example, transmission of a TCP ACK message from the UE is delayed or if a relatively large quantity of data is to be transmitted to the UE.

In some examples, the UE may support multiple modes for generating TCP ACK messages. For example, the UE may support one or more modes for generating TCP ACK messages, in which the UE may increase the size of a TCP ACK message (e.g., may increase a quantity of the data for which the TCP ACK message may be providing feedback) to reduce latency. In a first mode, the UE may transmit a single TCP ACK message in response to successfully receiving multiple (e.g., two) data packets at the UE. In a second mode, the UE may transmit TCP ACK messages according to a delay timer. For example, the UE may receive data packets during an active duration of the delay timer and may transmit a TCP ACK message for the received data packets in response to a lapsing of the active duration of the delay timer (e.g., upon expiration of the delay timer). In some examples, while generating TCP ACK messages in accordance with the first mode and the second mode may reduce latency, an increase in the size of TCP ACK messages transmitted from the UE may degrade downlink data scheduling (e.g., scheduling of subsequent data packets to be transmitted to the UE), which may lead to reduced performance at the UE.

Various aspects of the present disclosure generally relate to techniques that support TCP ACK shaping, and more specifically, to techniques for generating TCP ACK messages based on characteristics associated with downlink communications and uplink communications between the UE and the network. In some examples, the UE may determine (e.g., derive or obtain) a delay timer (e.g., an enhanced delay timer) for generating TCP ACK messages based on a downlink data pattern associated with downlink data packets received at the UE (e.g., characteristics of downlink communications between the UE and the network) and an uplink scheduling pattern associated with uplink data packets to be transmitted from the UE (e.g., characteristics of uplink communications between the UE and the network). In some examples, the UE may determine a duration of the delay timer such that a size of a TCP ACK message generated in response to the duration of the delay timer lapsing (e.g., a quantity of data received during the duration of the delay timer, a quantity of data for which the generated TCP ACK message may be providing feedback) may be suitable for downlink and uplink communications between the UE and the network.

Additionally, or alternatively, the UE may use an application processor associated with the UE to generate multiple TCP ACK messages (e.g., multiple TCP ACK message segments) based on a single TCP ACK message generated (e.g., at a TCP layer associated with the UE) in response to the UE receiving a downlink data packet. In some examples, the UE may generate multiple TCP ACK message segments, such that a TCP ACK message segment (e.g., of the multiple TCP ACK message segments) may correspond to feedback for a portion of data included in the data packet received at the UE. The UE (e.g., the application processor associated with the UE) may generate the multiple TCP ACK message segments (e.g., may split the TCP ACK message generated at the TCP layer) based on the downlink data pattern (e.g., associated with downlink data packets received at the UE) and the uplink scheduling pattern (e.g., associated with uplink data packets to be transmitted from the UE).

In some examples, the UE may generate TCP ACK messages based on a transmission blanking pattern that indicates time intervals during which the UE may refrain from transmitting uplink messages (e.g., including TCP ACK messages and any other type of uplink message). In such examples, a size of the TCP ACK message (e.g., a quantity of the data for which the TCP ACK message may be providing feedback) may be based on the time intervals of the transmission blanking pattern. In some examples, the time intervals may be periodic and, in other examples, the time intervals may be aperiodic.

Particular aspects of the subject matter described herein may be implemented to realize one or more of the following potential advantages. In some examples, the techniques employed at the described communication devices may provide benefits and enhancements to the operation of the communication devices (e.g., one or more UEs, one or more network entities), including enabling TCP ACK message shaping based on characteristics associated with radio conditions within a wireless communications system. For example, operations performed at the described communication devices may enhance TCP ACK message generation based on a downlink data pattern, an uplink data pattern, or a transmission blanking pattern (or any combination thereof) associated with the described communication devices. Additionally, or alternatively, operations performed at the described communication devices may provide enhancements to communications between a communication device and the network by enabling the communication device to flexibly control the size of TCP ACK messages generated at the communication device. In some examples, the operations performed at the described communication devices may support improvements to the reliability of communications within the wireless communications system and increased data rates, among other possible benefits.

Aspects of the disclosure are initially described in the context of wireless communications systems. Aspects of the disclosure are further illustrated using, and described with reference to, process flows, apparatus diagrams, system diagrams, and flowcharts that relate to TCP ACK shaping.

FIG. 1 illustrates an example of a wireless communications system 100 that supports TCP ACK shaping in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a RAN node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) within which the UEs 115 and the network entity 105 may establish one or more communication links 125. The coverage area 110 may be an example of a geographic area within which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, anode of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support TCP ACK shaping as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical (PHY) layer structure for supporting the communication links 125. For example, a carrier used for a communication link 125 may include a portion of a RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_S=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may support a framework for generating TCP ACK messages based on characteristics associated with downlink communications and uplink communications for a UE 115. For example, a UE 115 may generate TCP ACK messages or TCP ACK message segments (or both) based on a downlink data pattern, a transmission blanking pattern, and an uplink scheduling pattern, such that the UE 115 (e.g., a data receiving entity) may transmit TCP ACK messages or TCP ACP message segments (or both) intelligently (e.g., in a timely manner) to a data transmitting entity, thereby achieving an improved performance (e.g., peak rate performance) and improved key performance indicators (KPIs), such as power KPIs. In some examples, the UE 115 may generate and transmit at least one TCP ACK message according to a delay timer for TCP ACK messages. A duration for the delay timer may be based on a downlink data pattern associated with downlink data packets for the UE 115 and an uplink scheduling pattern associated with uplink data packets for the UE 115.

In other examples, the UE 115 may receive a downlink data packet including a quantity of data. The downlink data packet may be associated with a TCP ACK message. The UE 115 may generate multiple TCP ACK message segments corresponding to the TCP ACK message based on the downlink data pattern associated with downlink data packets for the UE 115 and the uplink scheduling pattern associated with uplink data packets for the UE 115. The UE 115 may transmit the multiple TCP ACK message segments and each TCP ACK message segment may correspond to feedback for a respective portion of the quantity of data. In other examples, the UE 115 may generate and transmit at least one TCP ACK message associated with the quantity of data based on a transmission blanking pattern. The transmission blanking pattern may indicate one or more time intervals associated with refrainment of TCP ACK message transmission at the UE 115. The size of the at least one TCP ACK message may be based on the transmission blanking pattern.

Such techniques may lead to reduced latency and increased performance of communications between the UE 115 and the data transmitting entity, among other possible benefits.

Figure 2:
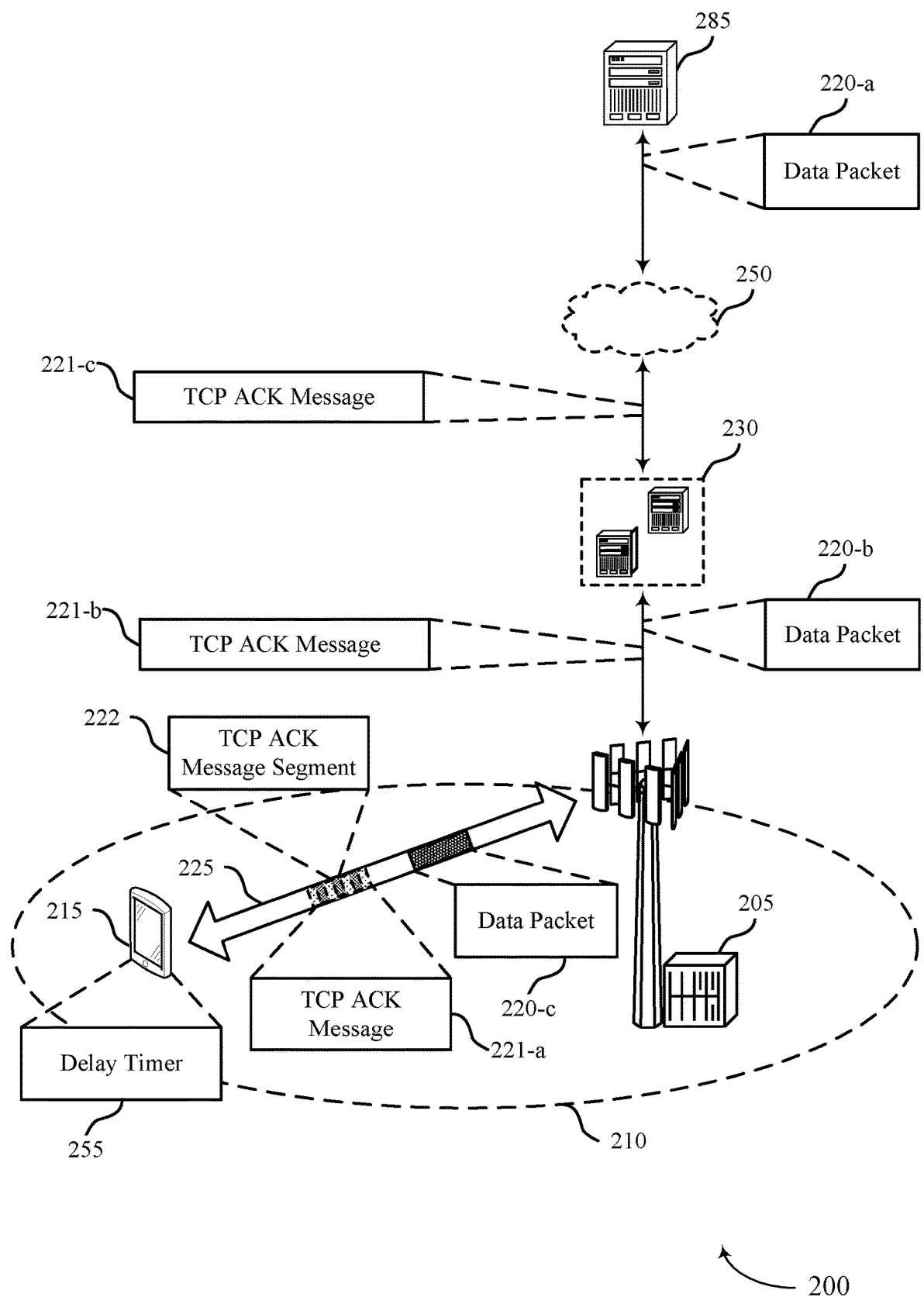

FIG. 2 illustrates an example of a wireless communications system 200 that supports TCP ACK shaping in accordance with one or more aspects of the present disclosure. In some examples, the wireless communications system 200 may represent an example of a wireless communications system 100 as described with reference to FIG. 1. For example, the wireless communications system 200 may include a UE 215, a network entity 205, a core network 230, and an IP service 250, which may be examples of the corresponding devices as described with reference to FIG. 1. Although illustrated in the example of FIG. 2 as a base station, the network entity 205 may also be an example of one or more other components or network entities 105 (e.g., a CU, a DU, an RU, an IAB node, a TRP, or one or more other network nodes) as described with reference to FIG. 1.

The wireless communications system 200 may also include a server 285, which may be an example of a remote server connected to a packet-switched network (e.g., the Internet or one or more other packet-switched networks), in which data packets may be exchanged between the server 285 and the UE 215 via one or multiple network connections. In the example of FIG. 2, the network entity 205 and the UE 215 may communicate within a coverage area 210 using a communication link 225, which may be an example of a communication link 125 as described with reference to FIG. 1. For example, the communication link 225 may be an example of an uplink, a downlink, or another type of communication link that supports wireless communications (e.g., over-the-air (OTA) communications) between the UE 215 and the network entity 205. In the example of FIG. 2, the UE 215 may be an example of a wired or wireless communication device that supports packet-based communications and may be referred to as a data receiver for a transport protocol. Additionally, or alternatively, the server 285 may be an example of a wired or wireless communication device or entity that supports packet-based communications and may be referred to as a data transmitter for a transport protocol (e.g., or some other equivalent protocol, such as an application layer protocol).

The wireless communications system 200 may support packet-based communications. For example, the core network 230 may include a user plane entity (e.g., a user plane function (UPF)), which may communicate with the IP service 250 using one or more backhaul links. The IP service 250 may include (e.g., provide) access to the internet, one or more intranets, an IMS, or one or more other packet-switched networks. As such, the user plane entity (e.g., of the core network 230) may be capable of transferring data packets between the IP service 250 and the UE 215 via the network entity 205.

The IP service 250 may be in communication with the server 285 (or one or more other servers) via a packet-switched network (e.g., the internet) or some other connection. The server 285 may be an example of a far-end or a remote server, such as an internet server. As described herein, the UE 215 and the server 285 may exchange one or more data packets 220 (e.g., IP packets, or some other type of packet). For example, the server 285 may transmit a data packet 220-*a* through the packet-switched network to the IP service 250 and the IP service 250 may forward the data packet 220-*a* to the core network 230 via a backhaul link. The core network 230 may forward the data packet 220-*b* through a backhaul link to the network entity 205 (e.g., a CU, a DU, an RU, a base station), and the network entity 205 may transmit the data packet 220-*c* to the UE 215 using the communication link 225. In some examples, the data packet 220-*a*, the data packet 220-*b*, and the data packet 220-*c* may be a same data packet or different data packets, or any combination thereof.

In some examples, a connection (e.g., a network connection, a virtual connection) between the UE 215 and the server 285 may be established and maintained using a TCP. The TCP may be associated with a transport layer and may be used with IP to ensure reliable transmission of packets (e.g., a TCP/IP protocol stack) between the server 285 and the UE 215 (or between the UE 215 and one or more other communication devices or entities). In some examples, the one or more data packets 220 transmitted using the TCP/IP may include an IP header and a TCP segment. The TCP segment may include a TCP header and data. The TCP header may include one or more fields configured to convey TCP information, such as a source identifier (ID), a destination ID, a sequence number (SN), a window size indication, other TCP information, or any combination thereof. The server 285 (e.g., the data transmitter), the UE 215 (the data receiver), or both, may acknowledge a data packet (e.g., one or more data packets 220) by transmitting a responsive ACK message, which may be referred to as a TCP ACK message. In some examples, a responsive TCP ACK message (e.g., one or more TCP ACK messages 221) may include the data packet (e.g., one or more data packets 220) and one or more bits indicating an ACK (or negative ACK (NACK)). For example, each of the one or more TCP ACK messages 221 may include an ACK bit in the TCP header set, or some other signal that verifies receipt (e.g., or failed receipt in the case of a NACK) of a corresponding data packet (e.g., one or more data packets 220).

In some examples, the UE 215 (e.g., the data receiver for the transfer protocol) may transmit the one or more TCP ACK messages 221 to the server 285 (e.g., the data transmitter for the transfer protocol) in response to successfully receiving the one or more data packets 220 from the server 285 (e.g., via the network entity 205 and the core network 230). That is, in some examples of data packet transmissions (e.g., downloading data) between the server 285 and the UE 215 using a TCP connection, a TCP ACK message (e.g., the one or more TCP ACK messages 221) may be transmitted (e.g., in the uplink direction) from the UE 215 to the server 285 to manage downlink scheduling. For example, in response to receiving the data packet 220-*c*, the UE 215 may transmit a TCP ACK message 221-*a* to the network entity 205 (e.g., a CU, a DU, an RU, a base station) using the communication link 225 and the network entity 205 may forward a TCP ACK message 221-*b* to the core network 230 using a backhaul link. The core network 230 may forward a TCP ACK message 221-*c* to the IP service 250 via a backhaul link and the IP service 250 may transmit the TCP ACK message 221-*c* to the server 285 through the packet-switched network. In some examples, the TCP ACK message 221-*a*, the TCP ACK message 221-*b*, and the TCP ACK message 221-*c* may be a same TCP ACK message or different TCP ACK messages, or any combination thereof.

In some examples, the server 285 (e.g., the TCP layer associated with the server 285) may have a transmission window, in which the server 285 may transmit data packets absent receipt of a TCP ACK message (e.g., responsive to the transmitted data packets). In such examples, if a duration of the transmission window lapses, the server 285 may refrain from transmitting subsequent data packets (e.g., the transmission window may stall). In some examples, the server 285 may resume data packet transmissions in response to receiving a TCP ACK message. For example, in response to receiving the one or more TCP ACK messages 221, the server 285 may transmit one or more data packets 220, which may lead to availability in the transmission window (e.g., a portion of a data buffer at the server 285 becomes available). As such, communications between the UE 215 and the server 285 may experience increases in latency if, for example, transmission of the one or more TCP ACK messages 221 from the UE 215 is delayed or if a relatively large quantity of data is to be transmitted to the UE 215 (e.g., downloaded from the server 285).

The UE 215 may implement multiple (e.g., different) mechanisms to increase the size of TCP ACK messages (e.g., to increase the quantity of data for which a TCP ACK message may be providing feedback) and improve the performance of the TCP data-path, for example with respect to OTA signaling (e.g., handlings in the radio environment). For example, exchanging messages (e.g., data packets, ACK messages) OTA (e.g., using the radio interface) may consume a relatively large portion of available radio resources (e.g., OTA communications may consume a relatively large portion of radio resources), which may be relatively scarce. As such, the UE 215 may use ACK coalescing (e.g., may combine ACK messages) to reduce the quantity of ACK messages transmitted using the radio interface, thereby conserving radio resources and reducing power consumption at the UE 215. In some examples, ACK coalescing may include the combining of TCP ACK messages at the UE 215 (e.g., at a TCP layer associated with the UE 215) prior to transmitting a TCP ACK message to the server 285 (or another data transmitter). For example, multiple TCP ACK messages (e.g., corresponding to respective data packets received at the UE 215 from the server 285) may be included as segments in a single TCP ACK message (e.g., a relatively large TCP ACK message) to be transmitted from the UE 215. In some examples, ACK coalescing may be based on a RAT used for exchanging messages (e.g., between the UE 215 and the server 285), downlink scheduling, or a quantity of data (e.g., a quantity of bytes) being acknowledged on a particular traffic flow, or any combination thereof. Additionally, or alternatively, in some examples of ACK coalescing, some TCP ACK messages may be discarded for (e.g., to accommodate) other uplink transmissions.

In some examples, relatively large TCP ACK messages (e.g., transmitted using a communication channel with a particular traffic flow) may lead to one or more inefficiencies associated with a transmission window (e.g., a buffer) of the server 285 (e.g., the data transmitter). Therefore, to reduce a size of TCP ACK messages (e.g., to avoid transmitting relatively large TCP ack messages), the UE 215 may implement an ACK shaping mechanism. In some examples, ACK shaping may include modifying (e.g., at a modem associated with the UE 215) a size of TCP ACK messages and a timing at which TCP ACK messages are transmitted (e.g., from the UE 215) to reduce burstiness in downlink data traffic (e.g., in the transmission of data packets). For example, the UE 215 may use ACK shaping to reduce the size of TCP ACK messages (e.g., reduce a quantity of data for which a TCP ACK message may provide feedback for) and improve buffer management (e.g., to refill buffers at the server 285, to improve efficiency of the transmission window) at the server 285 and with intermittent nodes in the data-path topology between different network entities (e.g., the network entity 205 and one or more other network entities) and data routers and the server 285.

Additionally, or alternatively, the UE 215 may use data coalescing to combine relatively small data packets (e.g., IP packets) based on radio characteristics, such as when a maximum transmission unit (MTU) of the system is relatively small compared to the data packet (e.g., the IP packet, the IP/TCP packet). For example, multiple data packets received at the UE 215 may be included as portions of a single data packet (e.g., a relatively large data packet) for which a single TCP ACK message may be generated (e.g., may provide feedback for). In some examples of data coalescing, the quantity of data packets to be processed (e.g., the processing of the TCP header and checksum of data packets and the processing associated with buffer management) at an application server associated with the UE 215 may be reduced. For example, various techniques may be used (e.g., at the UE 215) to achieve data coalescing at a modem of the UE 215, at a hardware transport level of the UE 215, at an application processor at the UE 215, or at the TCP stack associated with the UE 215, or any combination thereof. In some examples, such techniques may improve one or more key performance indicators (KPIs), such as power KPIs associated with communications between the UE 215 and the server 285, and increase throughput (e.g., throughput factors) of communications between the UE 215 and the server 285.

In some examples, while ACK coalescing, ACK shaping, and data coalescing may be implemented to reduce latency and accommodate for resource constraints (e.g., associated with a machine performance ratio in million instructions per second (MIPS), memory, radio conditions, transmit power, resource grants), such mechanism may be adverse to TCP window management mechanisms performed at the server 285 (or the network entity 205, or the core network 230, or any combination thereof). For example, ACK coalescing, ACK shaping, and data coalescing mechanisms may lead to TCP transmission scheduling (e.g., downlink scheduling) becoming relatively more bursty (e.g., relatively less smooth). In some examples, burstiness (e.g., relatively bursty traffic) may lead to reduced user experience (e.g., may reduce the performance of the UE 215 and quality of the user experience).

In some examples, the UE 215 may support multiple modes of operation for generating ACK messages in the uplink direction (e.g., for downlink data traffic), in which the UE 215 may increases the size of ACK messages (e.g., using ACK coalescing, ACK shaping, and data coalescing mechanisms, or some other mechanism for increasing the size of ACK messages) to reduce latency. Such modes may include a quick-ACK mode and a delayed-ACK mode. In some examples, the quick-ACK mode and a delayed-ACK mode may degrade downlink scheduling (e.g., may lead to adverse effects from the radio traffic pattern perspective).

In some examples, the quick-ACK mode may include generation of an ACK message (e.g., a single TCP ACK message, the TCP ACK message 221-c) for multiple data packets (e.g., generation of a TCP ACK message for alternative TCP packets). For example, the UE 215 may generate the TCP ACK message 221-c for multiple (e.g., two) data packets received at the UE 215 (e.g., one or more data packets 220). In some examples, the quick-ACK mode may improve connection establishment procedures (e.g., that may be relatively slow or delayed) and window recovery mechanisms (e.g., to improve transmission window scaling and data availability).

The delayed-ACK mode may include generation of TCP ACK messages for downlink traffic based on parameters associated with downlink traffic flow management. For example, the TCP (e.g., algorithms of the TCP) may consider multiple factors associated with downlink traffic flow in the determination of (e.g., multiple downlink traffic flow parameters as input for calculating) a delay ACK timer for generating ACK messages. Such factors may include an end-to-end (E2E) TCP round-trip-time (RTT), a transmission window (e.g., a transmission window negotiated between the server 285), a delay ACK timer (e.g., a minimum delay ACK timer or an otherwise suitable delay ACK timer) that may be selected at the UE 215 (e.g., chosen for an operating system used at the UE 215), a quantity of data in a receive window (e.g., an amount of data pending in a buffer at the UE 215), a quantity of data in a transmission window (e.g., an amount of data pending in a buffer at the server 285), TCP parameters (e.g., socket options negotiated at the UE 215 or the server 285), data processing timelines (e.g., current processing timelines), among other examples. That is, downlink traffic flow management parameters may be used to generate a delay ACK timer (e.g., determine a duration for the delay ACK timer) used at the UE 215 for generating ACK messages (e.g., in the delayed-ACK mode). In some examples, an ACK may be generated based on the calculated delay-ACK timer condition being met. That is, the UE 215 may receive one or more data packets 220 during the duration of the delay ACK timer and may generate the TCP ACK message 221-*c* for the one or more data packets 220 upon (e.g., in response to, subsequent to) an lapsing of the duration of the delay ACK timer. In some examples, the TCP ACK message 221-*c* may be transmitted in the uplink direction from an application processor at the UE 215 to a modem at the UE 215.

In some examples, while the quick-ACK mode and the delayed-ACK mode may reduce latency, an increase in the size of TCP ACK messages transmitted from the UE 215 (e.g., while operating in the delayed-ACK mode or the quick-ACK mode) may degrade downlink data scheduling (e.g., of data packets transmitted via one or more network entities) and may lead to reduced performance at the UE 215. For example (e.g., due to relatively large TCP ACK messages), downlink communications (e.g., with increased, relatively peak, or otherwise suitable data rates) may experience multiple (e.g., different) RTTs at an E2E TCP level (e.g., a TCP layer, a transport layer) and multiple (e.g., different) downlink scheduling patterns at a radio level (e.g., a PHY layer, a data link layer) irrespective of relatively smooth data traffic between the server 285 and the UE 215 (e.g., relatively smooth data traffic being delivered to a TCP application at the UE 215). That is, while some mechanisms (e.g., dynamics) may provide for improved processing KPIs, reduced TCP ACK message size, shaping of TCP ACK messages based on the transmission window or buffer management, and improved RTT, delayed ACK messages (e.g., generated in the delayed-ACK mode) and quick ACK messages (e.g., generated in the quick-ACK mode) may lead to the generation of relatively larger TCP ACK messages which may degrade (e.g., be adverse to) downlink data scheduling.

For example, transmission of a relatively large TCP ACK messages may lead to a relatively quick (e.g., sudden) clearing (e.g., flushing) of the transmission window buffers (e.g., at the server 285) and replenishing delays (e.g., to achieve relatively smooth downlink data scheduling), thereby degrading downlink data scheduling. Additionally, or alternatively, delays in subsequent TCP ACK message transmissions due to ACK shaping (e.g., traffic flow smoothening logics) may increase an RTT associated with a corresponding data packet. Moreover, uneven window data availability (e.g., unbalanced data availability associated with the transmission window and the receive window) and relatively bursty traffic modes of operation may reduce data rates (e.g., peak data rates, average data rates) and KPIs (e.g., power KPIs), among other examples. Therefore, techniques which enable the UE 215 to balance the generation of ACK messages (e.g., relatively smoothly) between the quick-ACK mode and the delayed-ACK mode may provide one or more benefits to downlink data scheduling.

For example, the UE 215 may include a modem, such as multiple subscriber identity (SIM) modem (e.g., a dual SIM that supports dual SIM dual active (DSDA) or dual SIM dual standby (DSDS) operation modes, or other multi-SIM modem), in which the multiple subscribers may operate using multiple (e.g., different) radio frequency bands. In such an example, the UE 215 may transmit uplink messages (e.g., including TCP ACK messages) according to a transmission blanking pattern. For example, due to some radio frequency bands (e.g., associated with one or multiple subscribers, associated with one or multiple radio systems) being coordinated (or uncoordinated) the UE 215 may not be capable of transmitting uplink messages during some time intervals. The time intervals may occur in accordance with a pattern that may be referred to as a transmission blanking pattern. For example, if the UE 215 is operating in DSDA, such that the UE 215 may receive downlink data using one subscription (e.g., one subscriber identity) and may use another subscription (e.g., another subscriber identity) to transmit or receive other data, the UE 215 may experience interference (e.g., interference internal to the UE, in-device interference) and may refrain from receiving the downlink data (or the other data). Additionally, or alternatively, the UE 215 may be configured to refrain from transmitting uplink communications (e.g., according to a transmission blanking pattern) to reduce coordinated interference or informed interference associated with the network, network vendors, or network operators, or any combination thereof. As such, techniques which enable the UE 215 to consider time intervals (e.g., ON durations and OFF durations) of a transmission blanking pattern in the generation of ACK messages (e.g., in determining a quantity or size of ACK message to transmit in the uplink direction) may provide one or more benefits to downlink data scheduling.

That is, the UE 215 may perform ACK shaping (or ACK coalescing, receive side coalescing), in which the UE 215 may combine data packets received at the UE 215 and generate relatively large TCP ACK messages. However, due to delayed-ACK message mechanisms (e.g., the delayed-ACK mode), the size of generated TCP ACK messages may be increased and lead to a relatively quick (e.g., sudden) depletion of buffers (e.g., a transmission window) at the server 285 (e.g., the data transmitter), thereby degrading downlink scheduling for the UE 215. As such, techniques that enable the UE 215 to generate TCP ACK messages based on a time duration in which the UE 215 may not be transmitting uplink messages (e.g., OFF durations that occur during delayed-ACK mode operations), a quantity of data received during such time durations, a quantity of ACK messages pending at the UE 215 (e.g., buffering at the UE 215), and a quantity of ACK messages to be transmitted during a time duration in which the UE 215 may transmit uplink messages (e.g., upon beginning an ON duration, subsequent to a lapsing of an OFF duration) may provide one or more benefits to downlink data scheduling.

Additionally, or alternatively, due to aperiodic or periodic time intervals in which the UE 215 may not be capable of transmitting uplink messages (e.g., due to a transmission blanking pattern based on in-device interference, outside device interference, coordinated interference, or informed interference), techniques that enable the UE 215 to generate ACK messages (e.g., subsequent to a lapsing of a time duration of the transmission blanking pattern in which the UE 215 may not be capable of transmitting uplink messages) based on downlink traffic (e.g., downlink activity), uplink ACK messages pending at the UE 215, uplink bandwidth (e.g., available uplink bandwidth for transmitting the uplink ACK messages), may provide one or more benefits to downlink data scheduling and improve the reliability of communications within the wireless communications system 200.

In some examples, techniques for TCP ACK shaping, as described herein, may provide one or more enhancements to communications between the UE 215 and the network by enabling the UE 215 balance the generation of ACK messages (e.g., relatively smoothly) between the quick-ACK mode and the delayed-ACK mode and by enabling the UE 215 to generate ACK messages based on a transmission blanking pattern at the UE 215. For example, some techniques for TCP ACK shaping, as described herein, may enable the UE 215 to modify mechanisms for generating TCP ACK messages (e.g., TCP ACK generation logic at an application processor at the UE 215) based on radio conditions within the wireless communications system 200 (e.g., one or more inputs) and generate multiple (e.g., different) sets of TCP ACK messages at the application processor at the UE 215 (e.g., at the modem level) based on a TCP ACK message generated at a TCP layer at the UE (e.g., the TCP stack).

For example, as illustrated in the example of FIG. 2, the UE 215 may generate and transmit at least one TCP ACK message (e.g., the TCP ACK message 221-*a*) according to a delay timer 255 for TCP ACK message. A duration for the delay timer 255 may be determined at the UE 215 based on a downlink data pattern associated with data packets for the UE 215 (e.g., one or more data packets 220) and an uplink scheduling pattern associated with uplink data packets for the UE 215. In some examples, the UE 215 may receive the data packet 220-*c* including a quantity of data. The data packet 220-*c* may be associated with a TCP ACK message. The UE 215 may generate multiple TCP ACK message segments 222 corresponding to the TCP ACK message based on the downlink data pattern associated with downlink data packets (e.g., one or more data packets 220) for the UE 215 and the uplink scheduling pattern associated with uplink data packets for the UE 215. The UE 215 may transmit the multiple TCP ACK message segments 222 and each of the multiple TCP ACK message segments 222 may correspond to feedback for a respective portion of the quantity of data. In other examples, the UE 215 may generate and transmit at least one TCP ACK message (e.g., the TCP ACK message 221-*a*) associated with the quantity of data based on a transmission blanking pattern. The transmission blanking pattern may indicate one or more time intervals associated with refrainment of TCP ACK message transmission at the UE 215. The size of the TCP ACK message 221-*a* may be based on the transmission blanking pattern. That is, the UE 315 may generate TCP ACK messages or TCP ACK message segments (or both) based on a downlink data pattern, outstanding uplink TCP ACK messages, and an uplink scheduling pattern (e.g., a radio pattern), which may lead to reduced latency and increase performance of communications between the UE 215 and the server 285, among other possible benefits.

Figure 3:
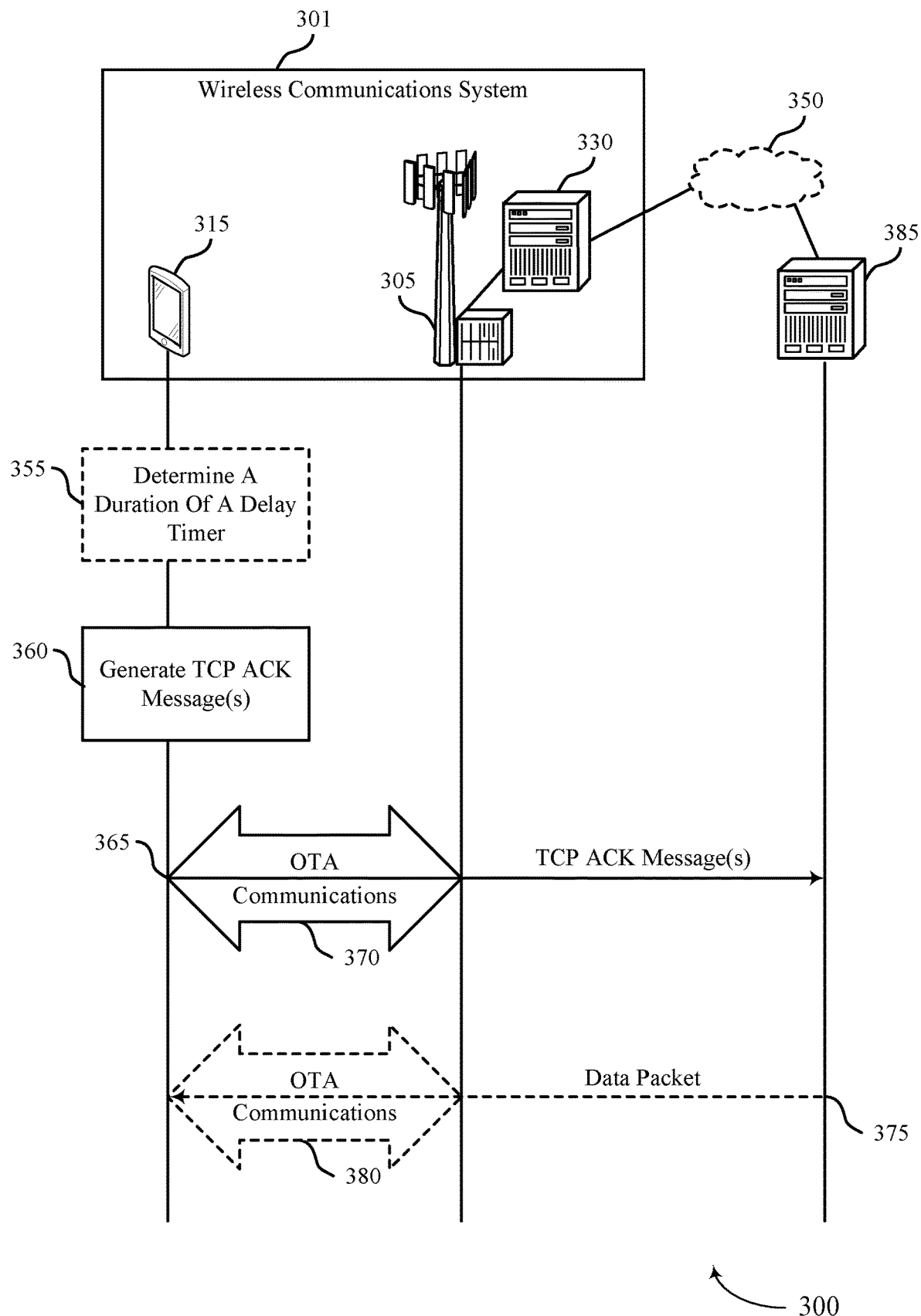
FIGS. 3 through 5 each illustrate an example of a process flow that supports TCP ACK shaping in accordance with one or more aspects of the present disclosure.

FIG. 3 illustrates an example of a process flow 300 that supports TCP ACK shaping in accordance with one or more aspects of the present disclosure. The process flow 300 may implement or be implemented at some aspects of the wireless communications system 100 or the wireless communications system 200. For example, the process flow 300 may include illustrates techniques for generating TCP ACK messages based on characteristics associated with downlink communications and uplink communications between a UE 315 and a server 385. The UE 315 and the server 385 may be examples of the corresponding devices as described with reference to FIGS. 1 and 2. In the example of FIG. 3, communications (e.g., the downlink communications and the uplink communications) between the UE 315 and the server 385 may be supported using (e.g., may be relayed using, may be transferred via) an IP service 350, a core network 330, or a network entity 305, or any combination thereof. The IP service 350, the core network 330, and the network entity 305 may be examples of the corresponding devices (or entities) as described with reference to FIGS. 1 and 2.

The UE 315 may be in communication with the network entity 305 within a wireless communications system 301, which may be an example of a wireless communication system as described with reference to FIGS. 1 and 2. In the example of FIG. 3, the network entity 305 may be an example of a base station, an IAB node, an RU, a CU, a DU, or some other network node. The network entity 305 may communicate with a core network 330 via a wired or wireless backhaul link. The wireless communications system 301 may, in some examples, be referred to as a RAN.

The core network 330 may include a user plane entity (e.g., a UPF) that may be connected with the IP service 350. The IP service 350 may provide the user plane entity with access to the server 385. The user plane entity may transfer data packets to and from the core network 330 and the server 385. The UE 315 and the server 385 may therefore exchange data packets via the IP service 350 and the wireless communications system 301. The process flow 300 may be implemented at the UE 315, the network entity 305, the core network 330, the IP service 350, or the server 385, or any combination thereof. In the following description of the process flow 300, operations between the UE 315 and the server 385 may occur in a different order or at different times than as shown. Some operations may be omitted from the process flow 300, and other operations may be added to the process flow 300.

Although some data packets are shown as being transferred directly between the UE 315 and the server 385, it is to be understood that the data packets may be relayed or switched OTA or via wired connections between the UE 315, the network entity 305, the core network 330, the IP service 350, and the server 385 (or one or more other networks, network entities, or components). Additionally, or alternatively, although the UE 315, the network entity 305, and the server 385 are shown performing the operations of the process flow 300, some aspects of some operations may also be performed by one or more other communication devices or entities as described with reference to FIGS. 1 and 2.

In some examples, the UE 315 may modify a TCP ACK generation logic at an application processor associated with the UE 315 based on one or more inputs associated with radio communications (e.g., the downlink communications and the uplink communications) between the UE 315 and the server 385 to generate TCP ACK messages. For example, based on such inputs (e.g., inputs associated with radio conditions at the UE 315), the UE 315 may derive a TCP delayed ACK timer (e.g., an enhanced TCP Delay ACK timer) to be used at the UE 315 (e.g., at the TCP stack associated with the UE 315) to achieve improved user performance due to improved memory management, improved receive window management, increased throughput, increased RTT of data packets, and improved power KPIs at the UE 315 (e.g., at an application processor associated with the UE 315).

For example, at 355, the UE 315 may determine a duration for a delay timer for TCP ACK messages based on a downlink data pattern associated with downlink data packets for the UE 315 and an uplink scheduling pattern associated with uplink data packets for the UE 315. The delay timer may be an example of a delay timer described with reference to FIG. 2. For example, the delay timer may be determined at the UE 315 based on an RTT associated with a TCP at the UE 315, a time duration for receiving data packets, a delay ACK timer associated with transmitting TCP ACK messages, a quantity of data associated with the TCP ACK messages, one or more TCP parameters associated with the TCP at the UE 315, or a processing time associated the TCP ACK messages, or any combination thereof.

At 360, the UE 315 may generate one or more TCP ACK message in accordance with the delay timer. For example, the UE 315 may generate the one or more TCP ACK messages in response to an expiration (e.g., lapsing) of the duration for the delay timer. In some examples, the UE 315 may generate the one or more TCP ACK messages based on a quantity of TCP ACK messages in a buffer of the UE 315 (e.g., outstanding TCP ACK messages).

At 365, the UE 315 may transmit the one or more TCP ACK messages based on the generating at 360. For example, the UE 315 may transmit the one or more TCP ACK messages after the expiration of the duration of the delay timer. In some examples, transmitting the one or more TCP ACK messages may include transmitting the one or more TCP ACK messages to the network entity 305 using OTA communications 370. The network entity 305 may forward the one or more TCP ACK messages to the server 385 via the core network 330 and the IP service 350 (e.g., using one or more backhaul links and a packet-switched network).

In some examples, at 375, the UE 315 may receive a data packet in response to the one or more TCP ACK messages (e.g., transmitted from the UE 315 at 365). In such an example, the data packet may include a quantity of data that may be based on the one or more TCP ACK messages. For example, a quantity of data included in the data packet may be based on a quantity of data (e.g., a maximum quantity of data or an otherwise suitable quantity of data) for which the one or more TCP ACK messages may be providing feedback. In some examples, receiving the data packet at 375 may include the server 385 transmitting the data packet to the network entity 305 via the IP service 350 and the core network 330 (e.g., using the packet-switched network and one or more backhaul links). The network entity 305 may then forward the data packet to the UE 315 using OTA communications 380. In some examples, generating and transmitting the TCP ACK messages based on the delay timer may lead to improved TCP scheduling (e.g., improved downlink scheduling), thereby enabling the UE 315 to achieve improved UE performance, among other possible benefits. For example, upon expiration of the delay timer, a TCP associated with the UE 315 may have 5000 bytes to acknowledge. In such an example, a maximum or otherwise suitable quantity of data for which a TCP ACK may provide feedback may be set to 1500 bytes and, as such, the TCP associated with the UE 315 may transmit 4 acks, in which each TCP ACK may provide feedback for 1500 bytes (e.g., the TCP may transmit TCP ACK SN=1500, 3000, 4500, 5000).

Figure 4:
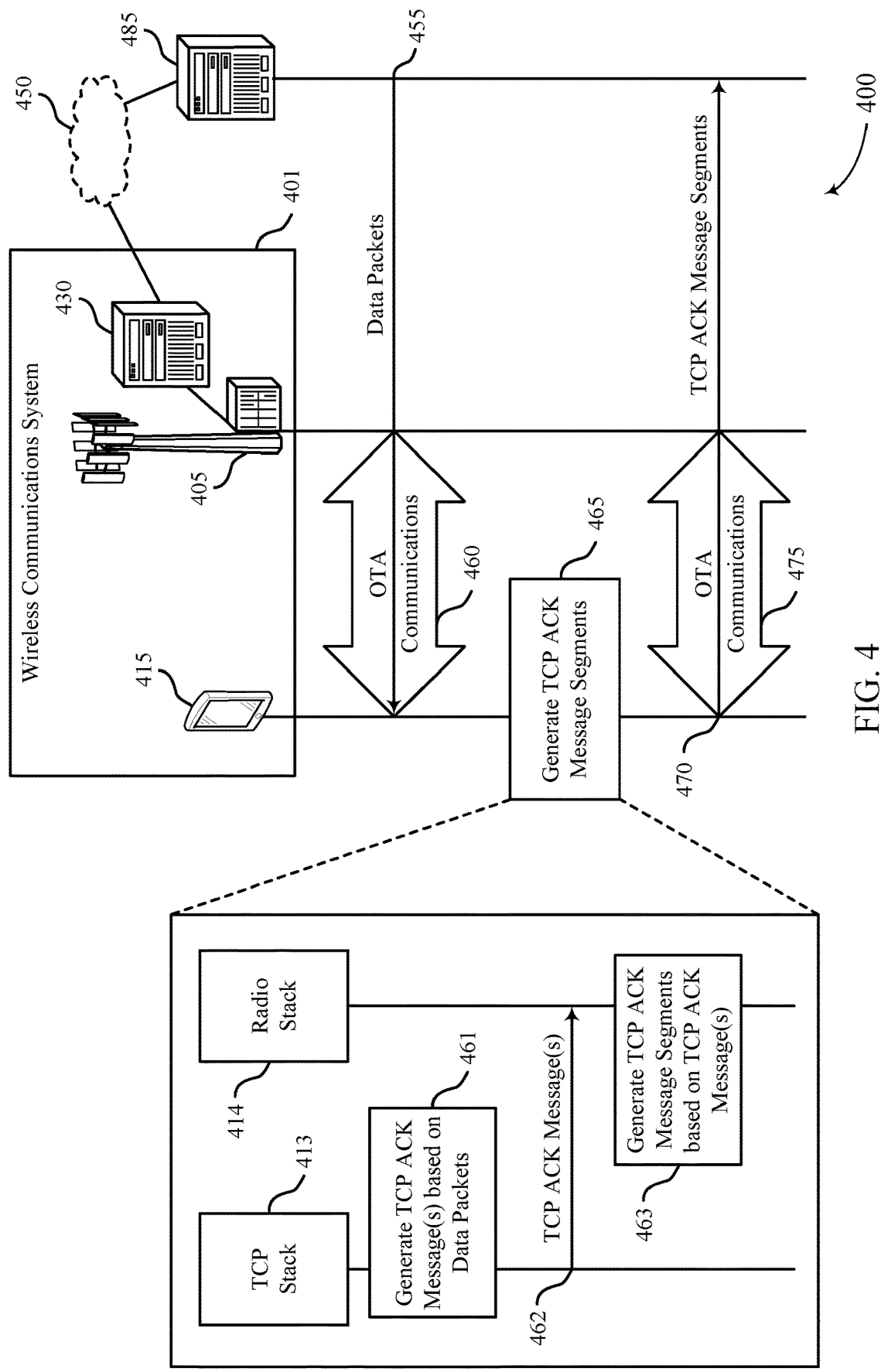

FIG. 4 illustrates an example of a process flow 400 that supports TCP ACK shaping in accordance with one or more aspects of the present disclosure. The process flow 400 may implement or be implemented at some aspects of the wireless communications system 100, the wireless communications system 200, and the process flow 300. For example, the process flow 400 may include illustrates techniques for generating TCP ACK messages based on characteristics associated with downlink communications and uplink communications between a UE 415 and a server 485. The UE 415 and the server 485 may be examples of the corresponding devices as described with reference to FIGS. 1 through 3. In the example of FIG. 4, communications (e.g., the downlink communications and the uplink communications) between the UE 415 and the server 485 may be supported using (e.g., may be relayed using, may be transferred via) an IP service 450, a core network 430, or a network entity 405, or any combination thereof. The IP service 450, the core network 430, and the network entity 405 may be examples of the corresponding devices (or entities) as described with reference to FIGS. 1 through 3.

The UE 415 may be in communication with the network entity 405 within a wireless communications system 401, which may be an example of a wireless communication system as described with reference to FIGS. 1 and 2. In the example of FIG. 4, the UE 415 may include a TCP stack 413 and a radio stack 414 (e.g., a protocol stack for radio communications). Additionally, or alternatively, in the example of FIG. 4, the network entity 405 may be an example of a base station, an IAB node, an RU, a CU, a DU, or some other network node. The network entity 405 may communicate with a core network 430 via a wired or wireless backhaul link. The wireless communications system 401 may, in some examples, be referred to as a RAN.

The core network 430 may include a user plane entity (e.g., a UPF) that may be connected with the IP service 450. The IP service 450 may provide the user plane entity with access to the server 485. The user plane entity may transfer data packets to and from the core network 430 and the server 485. The UE 415 and the server 485 may therefore exchange data packets via the IP service 450 and the wireless communications system 401. The process flow 400 may be implemented at the UE 415, the network entity 405, the core network 430, the IP service 450, or the server 485, or any combination thereof. In the following description of the process flow 400, operations between the UE 415 and the server 485 may occur in a different order or at different times than as shown. Some operations may be omitted from the process flow 400, and other operations may be added to the process flow 400.

Although some data packets are shown as being transferred directly between the UE 415 and the server 485, it is to be understood that the data packets may be relayed or switched OTA or via wired connections between the UE 415, the network entity 405, the core network 430, the IP service 450, and the server 485 (or one or more other networks, network entities, or components). Additionally, or alternatively, although the UE 415, the network entity 405, and the server 485 are shown performing the operations of the process flow 400, some aspects of some operations may also be performed by one or more other communication devices or entities as described with reference to FIGS. 1 through 3.

In some examples, the UE 415 may modify a TCP ACK generation logic at an application processor associated with the UE 415 based on one or more inputs associated with radio communications (e.g., downlink communications and uplink communications) between the UE 415 and the server 485 to generate TCP ACK messages. For example, the UE 415 may generate multiple (e.g., different) sets of TCP ACK messages at the application processor (or modem) associated with the UE 415 based on a TCP ACK message associated with a received data packet (e.g., based on a TCP ACK message generated at a TCP stack associated with the UE 415). That is, the UE 415 may split TCP ACK messages in the uplink direction (e.g., may perform reverse ACK coalescing) by generating multiple TCP ACK messages (e.g., TCP ACK message segments) based on a relatively large TCP ACK message (e.g., a TCP ACK message representing a relatively large quantity of bytes acknowledged in a single time instance). In some examples, generating the multiple TCP ACK message segments (e.g., splitting the relatively large TCP ACK message) may be achieved using multiple (e.g., various) techniques that may include updating the data packet parameters, such that a checksum associated with the data packet may be updated, and determining whether the data packet is valid. That is, the UE 415 may update one or more parameters associated with the data packet (e.g., based on generating multiple TCP ACK message segments) and determining whether the data packet is valid based on the updating.

For example, the UE 415 may receive a data packet with bytes 1001-4000 and the TCP stack may generate a first TCP ACK message that acknowledges bytes 1001-2000 and a second TCP ACK message that acknowledges bytes 2001-4000. In some examples, the UE 415 may combine (e.g., using ACK coalescing) the first TCP ACK message and the second TCP ACK message prior to generating multiple TCP ACK message segments. For example, if the UE 415 is using a maximum (or otherwise suitable) TCP ACK message segment byte threshold of 400 bytes, the UE 415 may transmit multiple TCP ACK message segments for a combined TCP ACK message that includes both the first TCP ACK message and the second TCP ACK message (e.g., provides feedback for bytes 1001-4000) and each of the multiple TCP ACK message segments may provide feedback for less than or equal to 400 bytes. For example, the UE 415 may transmit a first TCP ACK message segment that acknowledges bytes 1001-1400, a second TCP ACK message segment that acknowledges bytes 1401-1800, a third TCP ACK message segment that acknowledges bytes 1801-2200, a fourth TCP ACK message segment that acknowledges bytes 2201-2600, etc. In other examples, the UE 415 may generate TCP ACK message segments for both the first TCP ACK message and the second TCP ACK message. For example, the UE 415 may transmit a first TCP ACK message segment that acknowledges bytes 1001-1400, a second TCP ACK message segment that acknowledges bytes 1401-1800, and a third TCP ACK message segment that acknowledges bytes 1801-2000. The UE 415 may then transmit a fourth TCP ACK message segment that acknowledges bytes 2001-2400, a fifth TCP ACK message segment that acknowledges bytes 2401-2800, etc.

In some examples, the UE 415 may generate TCP ACK message segments (e.g., may split a relatively large TCP ACK message) prior to performing ACK coalescing or ACK shaping. In such an example, the TCP ACK message segments (e.g., the split TCP ACK messages) may become candidates for the ACK coalescing or ACK shaping (or both). That is, the UE 415 may perform ACK coalescing or ACK shaping (or both) using the TCP ACK message segments generated at 465. In some examples, a quantity of data (e.g., bytes) acknowledged by each TCP ACK message segment (e.g., each split TCP ACK message) may depend on one or more ACK coalescing parameters (e.g., an ACK coalescing threshold), or one or more ACK shaping parameters (e.g., an ACK shaping token bucket size), or any combination thereof.

At 455, the UE 415 may receive a data packet including a quantity of data. In some examples, the data packet may be associated with a TCP ACK message. For example, a TCP ACK message may be generated using a TCP layer associated with the UE 415 in response to receiving the data packet. In some examples, receiving the data packet at 455 may include the server 485 transmitting the data packet to the network entity 405 via the IP service 450 and the core network 430 (e.g., using the packet-switched network and one or more backhaul links). The network entity 405 may then forward the data packet to the UE 415 using OTA communications 460.

At 465, the UE 415 may generate (e.g., using an application processor associated with the UE 415) TCP ACK message segments (e.g., corresponding to the TCP ACK message) based on a downlink data pattern associated with data packets for the UE 415 and an uplink scheduling pattern associated with uplink data packets for the UE 415. In such an example, a TCP ACK message segment (e.g., of multiple TCP ACK message segments generated at 465) may correspond to feedback for a respective portion of the quantity of data (e.g., included in the data packet received at 455).

In some examples, the TCP ACK message segments may be generated at 465 using the TCP stack 413 and the radio stack 414. For example, at 461, the TCP stack 413 may generate one or more TCP ACK messages based on the data packets received at 455. At 462, the TCP stack 413 may transmit the TCP ACK messages to the radio stack 414. At 463, the radio stack 414 may generate the TCP ACK message segments based on the TCP ACK messages generated at 461.

In some examples, the one or more TCP ack messages generated at 461 may be selective ACK (SACK) messages. SACK messages may allow a receiving device (e.g., the UE 415) to provide feedback for (e.g., ACK or NACK) discontinuous blocks of data packets which may be received at the UE 415. For example, multiple data packets including bytes 0 to 680 may be transmitted to the UE 415 and bytes 0-200 and 300-680 may be received at the UE 415. In such an example, a SACK may include a sequence number of received bytes (e.g., bytes 300-680) following a sequence number of a relatively last contiguous byte (e.g., 200) received at the UE 415. In such an example, a TCP ACK message may include the first sequence number (SN=200) and a SACK for bytes 300-680. Additionally, or alternatively, the TCP ACK message segments may be generated (e.g., from the TCP ACK message), such that each TCP ACK message segment may provide feedback for a threshold quantity of bytes (e.g., 200 bytes). For example, a first TCP ACK message segment may include feedback for bytes 0 to 200, a second TCP ACK message segment may include SN=200 and a SACK for bytes 300-500, and a third TCP ACK message segment may include SN=200 and a SACK for bytes 501-680.

In some examples, the UE 415 may generate the TCP ACK message segments (or one or more TCP ACK messages) based on a configured RAT, a configured downlink traffic type, a throughput associated with the downlink communications, one or more scheduling patterns (e.g., uplink scheduling patterns, downlink scheduling patterns), L2 window management and associated timers, a discontinuous reception (DRX) mode, and one or more other PHY layer parameters. For example, the UE 415 may generate the TCP ACK message segments (or one or more TCP ACK messages) based on a RAT associated with the UE 415, a throughput associated with the data packets for the UE 415, a time associated with layer two window management, or a DRX mode associated with the UE 415, or any combination thereof.

Additionally, or alternatively, the UE 415 may generate the TCP ACK message segments (or one or more TCP ACK messages) based on a quantity of TCP streams associated with the UE 415, a state (e.g., current state) of the TCP streams (e.g., a state of a transmission window of the TCP steams, TCP data packets pending in a buffer associated with the UE 415, pending transmissions, pending re-transmissions), and one or more TCP socket negotiated parameters (e.g., transmission window duration, one or more algorithms). For example, the UE 415 may generate the TCP ACK message segments (or one or more TCP ACK messages) based on a quantity of data streams associated with the data packets for the UE 415, a quantity of data streams associated with the uplink data packets for the UE 415, or one or more TCP parameters associated with a TCP at the UE 415, or any combination thereof.

In some examples, the UE 415 may generate the TCP ACK message segments (or one or more TCP ACK messages) based on a power (e.g., current power) and one or more performance aspects of the UE 415 (e.g., an operating power range, a thermal effects associated with the operating power range) and an uplink grant pattern (e.g., a rate of uplink data packet transmissions, a size of uplink data packet being transmitted, an RTT of the uplink data packets, a link quality of the uplink used to transmit uplink data packets). For example, the UE 415 may generate the TCP ACK message segments (or one or more TCP ACK messages) based on a transmit power associated with the uplink data packets for the UE 415, or an uplink grant pattern associated with the uplink data packets for the UE 415, or both.

Additionally, or alternatively, the UE 415 may generate the TCP ACK message segments (or one or more TCP ACK messages) based on an RTT (e.g., an overall RTT) of data packet at a TCP communication level (e.g., due to associated transport, scheduling, and ARQ mechanisms that occur prior to the TCP processing), as well as an RTT of a data packet at a radio communication level (e.g., due to associated scheduling, HARQ mechanisms, ARQ mechanisms, radio bearer, and RAT). For example, the UE 415 may generate the TCP ACK message segments (or one or more TCP ACK messages) based on an RTT associated with the data packets for the UE 415 and the uplink data packets for the UE 415.

In some examples, the UE 415 may generate the TCP ACK message segments (or one or more TCP ACK messages) based on a packet delay budget (PDB) of the data packets (e.g., an overall PDB for the given flow), one or more quality of service (QOS) characteristics, a traffic pattern, and a traffic type. For example, the UE 415 may generate the TCP ACK message segments (or one or more TCP ACK messages) based on a PDB associated with the data packets for the UE 415, a PDB associated with the uplink data packets for the UE 415, a QOS associated with the data packets for the UE 415, a QOS associated with the uplink data packets for the UE 415, a traffic type associated with the data packets for the UE 415, or a traffic type associated with the uplink data packets for the UE 415, or any combination thereof.

At 470, the UE 415 may transmit the TCP ACK message segments generated at 465. In some examples, transmitting the TCP ACK message segments may include transmitting the TCP ACK message segments to the network entity 405 using OTA communications 475. The network entity 405 may forward the TCP ACK message segments to the server 485 via the core network 430 and the IP service 450 (e.g., using one or more backhaul links and a packet-switched network). In some examples, generating and transmitting the TCP ACK message segments based on radio conditions at the UE 415 may lead to improved downlink scheduling, thereby enabling the UE 415 to achieve improved UE performance, among other possible benefits.

Figure 5:
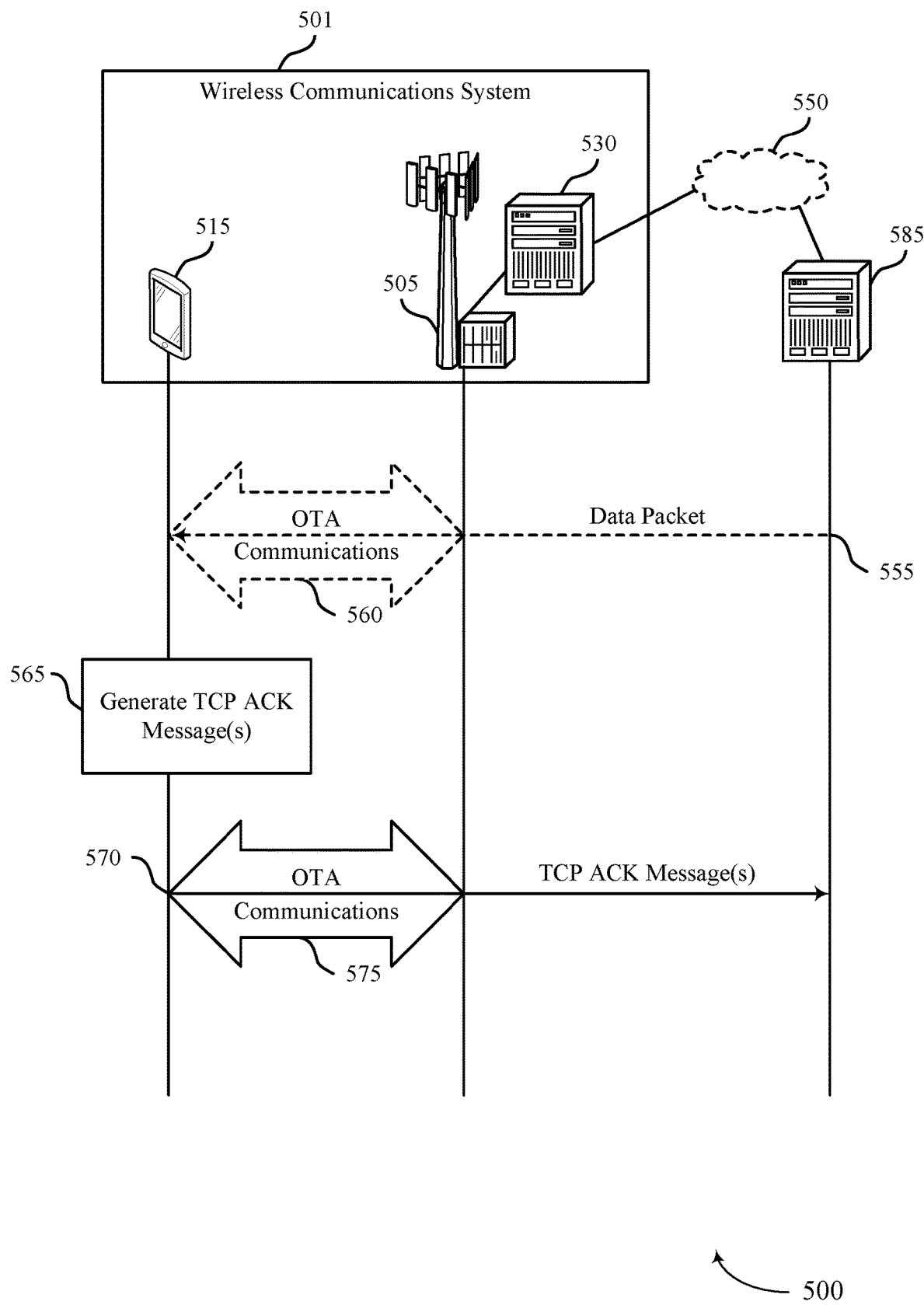

FIG. 5 illustrates an example of a process flow 500 that supports TCP ACK shaping in accordance with one or more aspects of the present disclosure. The process flow 500 may implement or be implemented at some aspects of the wireless communications system 100, the wireless communications system 200, the process flow 300, and the process flow 400. For example, the process flow 500 may include illustrates techniques for generating TCP ACK messages based on characteristics associated with downlink communications and uplink communications between a UE 515 and a server 585. The UE 515 and the server 585 may be examples of the corresponding devices as described with reference to FIGS. 1 through 4. In the example of FIG. 5, communications (e.g., the downlink communications and the uplink communications) between the UE 515 and the server 585 may be supported using (e.g., may be relayed using, may be transferred via) an IP service 550, a core network 530, or a network entity 505, or any combination thereof. The IP service 550, the core network 530, and the network entity 505 may be examples of the corresponding devices (or entities) as described with reference to FIGS. 1 through 3.

The UE 515 may be in communication with the network entity 505 within a wireless communications system 501, which may be an example of a wireless communication system as described with reference to FIGS. 1 and 2. In the example of FIG. 5, the network entity 505 may be an example of a base station, an IAB node, an RU, a CU, a DU, or some other network node. The network entity 505 may communicate with a core network 530 via a wired or wireless backhaul link. The wireless communications system 501 may, in some examples, be referred to as a RAN.

The core network 530 may include a user plane entity (e.g., a UPF) that may be connected with the IP service 550. The IP service 550 may provide the user plane entity with access to the server 585. The user plane entity may transfer data packets to and from the core network 530 and the server 585. The UE 515 and the server 585 may therefore exchange data packets via the IP service 550 and the wireless communications system 501. The process flow 500 may be implemented at the UE 515, the network entity 505, the core network 530, the IP service 550, or the server 585, or any combination thereof. In the following description of the process flow 500, operations between the UE 415 and the server 585 may occur in a different order or at different times than as shown. Some operations may be omitted from the process flow 500, and other operations may be added to the process flow 500.

Although some data packets are shown as being transferred directly between the UE 515 and the server 585, it is to be understood that the data packets may be relayed or switched OTA or via wired connections between the UE 515, the network entity 505, the core network 530, the IP service 550, and the server 585 (or one or more other networks, network entities, or components). Additionally, or alternatively, although the UE 515, the network entity 505, and the server 585 are shown performing the operations of the process flow 500, some aspects of some operations may also be performed by one or more other communication devices or entities as described with reference to FIGS. 1 through 4.

In some examples, the UE 515 may generate TCP ACK messages based on a transmission blanking pattern (e.g., ON and OFF time intervals), downlink radio characteristics (e.g., a downlink throughput and burstiness of downlink traffic), and uplink radio characteristics (e.g., pending TCP ACK messages, MIPS, power status, bandwidth availability). That is, the UE 515 may generate (or split) TCP ACK messages to reduce burstiness of TCP ACK message transmissions to the network (e.g., to enable relatively smooth TCP ACK message transmissions).

At 565, the UE 515 may generate one or more TCP ACK messages based on a transmission blanking pattern. The transmission blanking pattern may be an example of a transmission blanking pattern as described with reference to FIG. 2. For example, the transmission blanking pattern may indicate one or more time intervals associated with refrainment of transmission of TCP ACK messages (or any uplink communications). The time intervals indicated using the transmission blanking pattern may be periodic or aperiodic. Additionally, or alternatively, the transmission blanking pattern may be based on interference internal to the UE 515, interference external to the UE 515, coordinated interference, or informed interference, or any combination thereof.

In some examples, the one or more TCP ACK messages may be associated with a quantity of data. For example, at 555, the UE 515 may receive a data packet including the quantity of data during a time interval of the one or more time intervals associated with refrainment of transmission of TCP ACK messages. In such an example, generating the one or more TCP ACK message at 565 may be based on the time interval lapsing. In some examples, receiving the data packet at 555 may include the server 585 transmitting the data packet to the network entity 505 via the IP service 550 and the core network 530 (e.g., using the packet-switched network and one or more backhaul links). The network entity 505 may then forward the data packet to the UE 515 using OTA communications 560.

In some examples, a size of the one or more TCP ACK messages may be based on the transmission blanking pattern (e.g., the quantity of data received during the time interval). Additionally, or alternatively, the size of the one or more TCP ACK messages may be based on a quantity of TCP ACK messages being buffered at the UE 515, a machine performance rating associated with the UE 515 (e.g., MIPS), a transmit power associated with uplink data packets for the UE 515, a quantity of available bandwidth in an uplink direction, a throughput associated with data packets for the UE 515, or a burst associated with the data packets for the UE 515, or any combination thereof.

At 570, the UE 515 may transmit the one or more TCP ACK messages (e.g., generated at 565) in accordance with the transmission blanking pattern. In some examples, transmitting the one or more TCP ACK messages may include transmitting the one or more TCP ACK messages to the network entity 505 using OTA communications 575. The network entity 505 may forward the one or more TCP ACK messages to the server 585 via the core network 530 and the IP service 550 (e.g., using one or more backhaul links and a packet-switched network). In some examples, generating and transmitting the one or more TCP ACK messages based on radio conditions at the UE 515 and the transmission blanking pattern may lead to improved downlink scheduling, thereby enabling the UE 515 to achieve improved UE performance, among other possible benefits.

Figure 6:
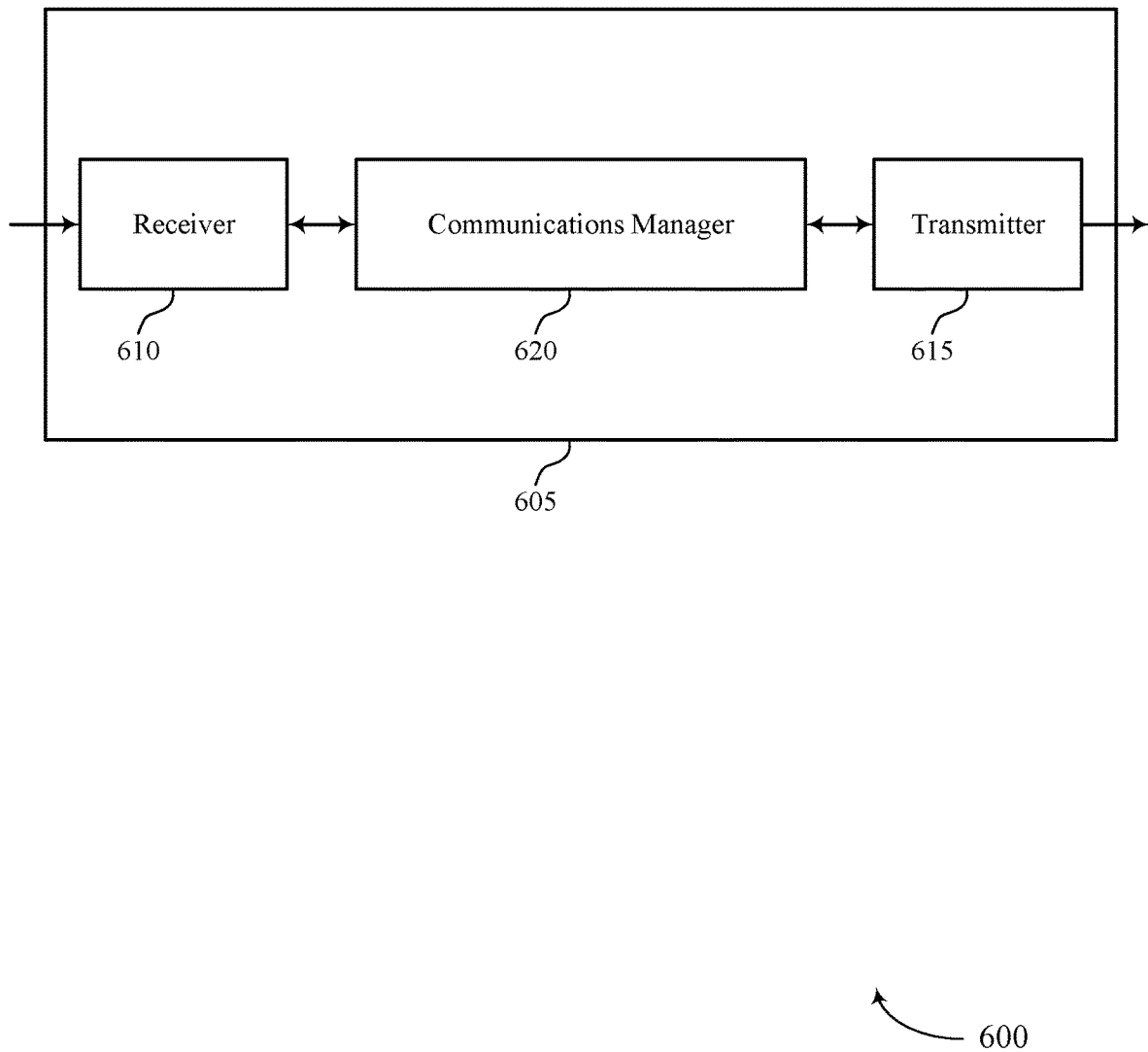
FIGS. 6 and 7 show block diagrams of devices that support TCP ACK shaping in accordance with one or more aspects of the present disclosure.

FIG. 6 shows a block diagram 600 of a device 605 that supports TCP ACK shaping in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to TCP ACK shaping). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to TCP ACK shaping). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of TCP ACK shaping as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE (e.g., the device 605) in accordance with examples as disclosed herein. For example, the communications manager 620 may be configured as or otherwise support a means for generating at least one TCP ACK message in accordance with a delay timer and based on a threshold ACK size for TCP ACK messages. The communications manager 620 may be configured as or otherwise support a means for transmitting the at least one TCP ACK message based on the generating.

Additionally, or alternatively, the communications manager 620 may support wireless communication at a UE (e.g., the device 605) in accordance with examples as disclosed herein. For example, the communications manager 620 may be configured as or otherwise support a means for receiving a first data packet including a first quantity of data and a second data packet including a second quantity of data, the first data packet associated with a first TCP ACK message and the second data packet associated with a second TCP ACK message. The communications manager 620 may be configured as or otherwise support a means for generating a set of multiple TCP ACK message segments corresponding to the first TCP ACK message and the second TCP ACK message based on a threshold ACK size for TCP ACK message segments, where the set of multiple TCP ACK message segments correspond to feedback for the first quantity of data and the second quantity of data. The communications manager 620 may be configured as or otherwise support a means for transmitting the set of multiple TCP ACK message segments based on the generating.

Additionally, or alternatively, the communications manager 620 may support wireless communication at a UE (e.g., the device 605) in accordance with examples as disclosed herein. For example, the communications manager 620 may be configured as or otherwise support a means for generating at least one TCP ACK message associated with a quantity of data based on a transmission blanking pattern that indicates one or more time intervals associated with refrainment of transmission of TCP ACK messages, where a size of the at least one TCP ACK message is based on the transmission blanking pattern. The communications manager 620 may be configured as or otherwise support a means for transmitting, based on the generating, the at least one TCP ACK message in accordance with the transmission blanking pattern.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced processing, reduced power consumption, and more efficient utilization of communication resources.

Figure 7:
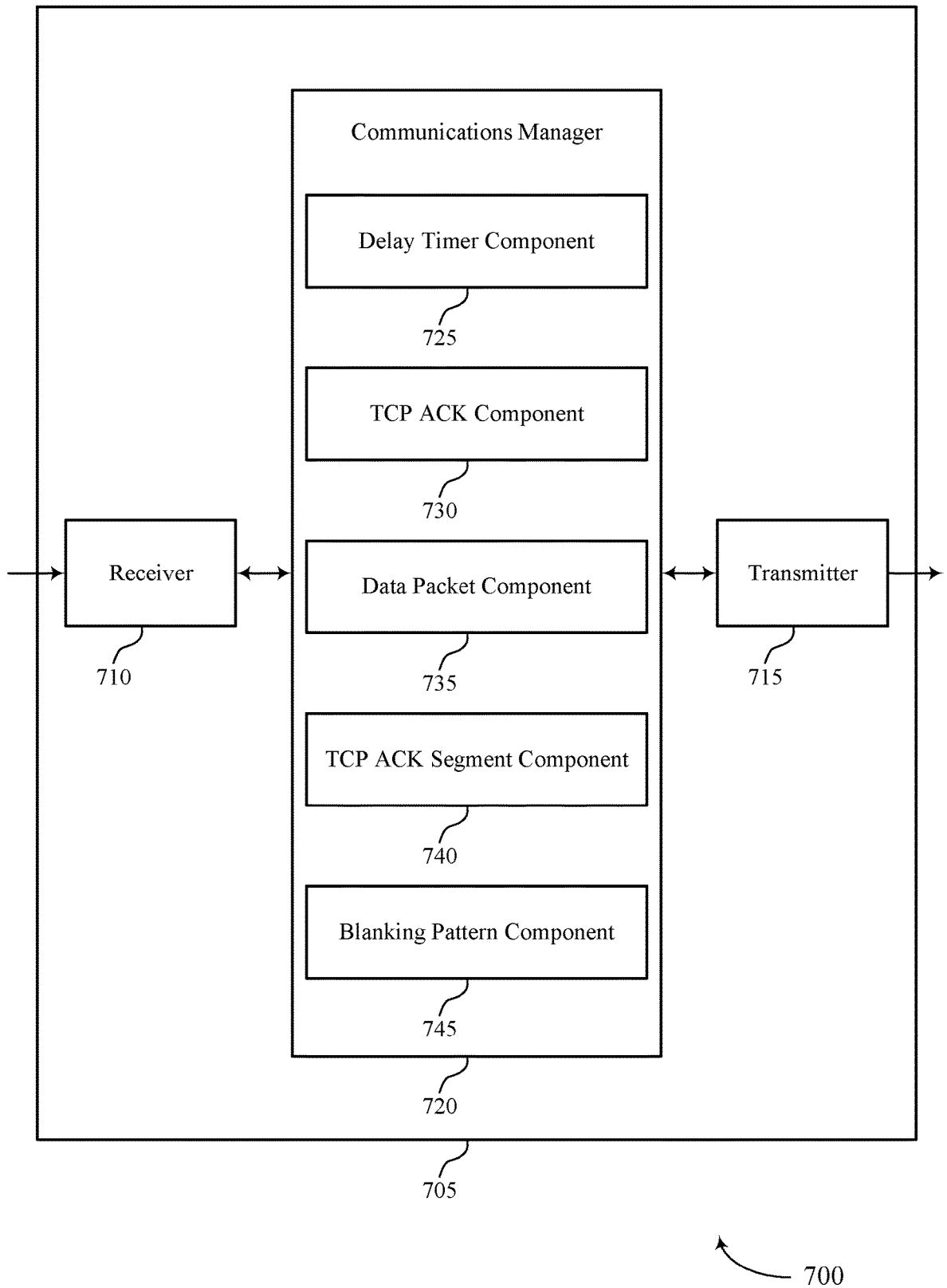

FIG. 7 shows a block diagram 700 of a device 705 that supports TCP ACK shaping in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to TCP ACK shaping). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to TCP ACK shaping). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of TCP ACK shaping as described herein. For example, the communications manager 720 may include a delay timer component 725, a TCP ACK component 730, a data packet component 735, a TCP ACK segment component 740, a blanking pattern component 745, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE (e.g., the device 705) in accordance with examples as disclosed herein. The delay timer component 725 may be configured as or otherwise support a means for generating at least one TCP ACK message in accordance with a delay timer and based on a threshold ACK size for TCP ACK messages. The TCP ACK component 730 may be configured as or otherwise support a means for transmitting the at least one TCP ACK message based on the generating.

Additionally, or alternatively, the communications manager 720 may support wireless communication at a UE (e.g., the device 705) in accordance with examples as disclosed herein. The data packet component 735 may be configured as or otherwise support a means for receiving a first data packet including a first quantity of data and a second data packet including a second quantity of data, the first data packet associated with a first TCP ACK message and the second data packet associated with a second TCP ACK message. The TCP ACK segment component 740 may be configured as or otherwise support a means for generating a set of multiple TCP ACK message segments corresponding to the first TCP ACK message and the second TCP ACK message based on a threshold ACK size for TCP ACK message segments, where the set of multiple TCP ACK message segments correspond to feedback for the first quantity of data and the second quantity of data. The TCP ACK segment component 740 may be configured as or otherwise support a means for transmitting the set of multiple TCP ACK message segments based on the generating.

Additionally, or alternatively, the communications manager 720 may support wireless communication at a UE (e.g., the device 705) in accordance with examples as disclosed herein. The TCP ACK component 730 may be configured as or otherwise support a means for generating at least one TCP ACK message associated with a quantity of data based on a transmission blanking pattern that indicates one or more time intervals associated with refrainment of transmission of TCP ACK messages, where a size of the at least one TCP ACK message is based on the transmission blanking pattern. The blanking pattern component 745 may be configured as or otherwise support a means for transmitting, based on the generating, the at least one TCP ACK message in accordance with the transmission blanking pattern.

Figure 8:
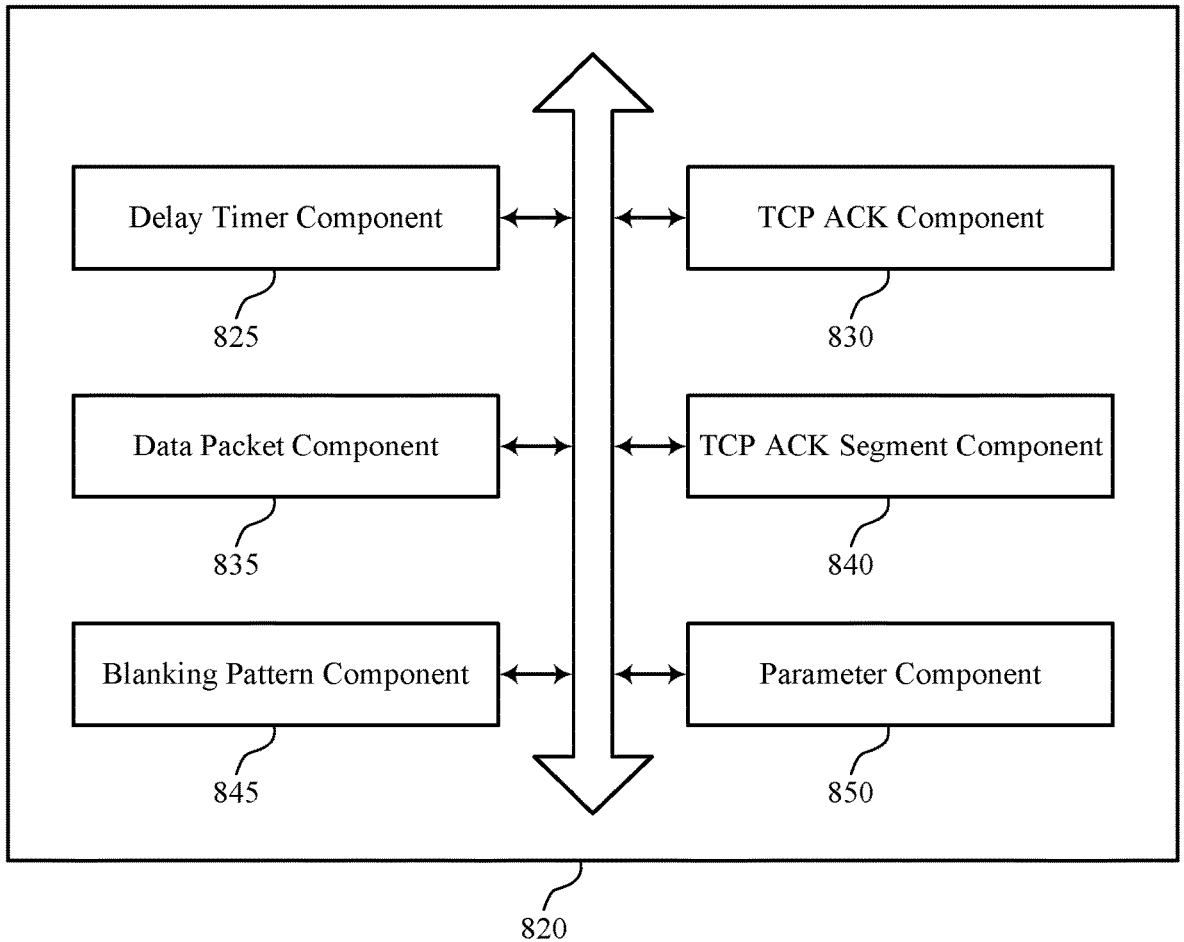
FIG. 8 shows a block diagram of a communications manager that supports TCP ACK shaping in accordance with one or more aspects of the present disclosure.

FIG. 8 shows a block diagram 800 of a communications manager 820 that supports TCP ACK shaping in accordance with one or more aspects of the present disclosure. The communications manager 820 may be an example of aspects of a communications manager 620, a communications manager 720, or both, as described herein. The communications manager 820, or various components thereof, may be an example of means for performing various aspects of TCP ACK shaping as described herein. For example, the communications manager 820 may include a delay timer component 825, a TCP ACK component 830, a data packet component 835, a TCP ACK segment component 840, a blanking pattern component 845, a parameter component 850, or any combination thereof. Each of these components may communicate, directly or indirectly, with one another (e.g., via one or more buses).

The communications manager 820 may support wireless communication at a UE in accordance with examples as disclosed herein. The delay timer component 825 may be configured as or otherwise support a means for generating at least one TCP ACK message in accordance with a delay timer and based on a threshold ACK size for TCP ACK messages. The TCP ACK component 830 may be configured as or otherwise support a means for transmitting the at least one TCP ACK message based on the generating. In some examples, a duration for the delay timer is based on a downlink data pattern associated with downlink data packets for the UE and an uplink scheduling pattern associated with uplink data packets for the UE.

In some examples, to support generating the at least one TCP ACK message in accordance with the delay timer, the delay timer component 825 may be configured as or otherwise support a means for generating the at least one TCP ACK message in response to an expiration of a duration for the delay timer, where the at least one TCP ACK message is transmitted after the expiration of the duration of the delay timer. In some examples, to support generating the at least one TCP ACK message in accordance with the delay timer, the delay timer component 825 may be configured as or otherwise support a means for generating the at least one TCP ACK message based on a quantity of TCP ACK messages in a buffer of the UE.

In some examples, the delay timer component 825 may be configured as or otherwise support a means for determining a duration for the delay timer based on an RTT associated with a TCP at the UE, a time duration for receiving data packets at the UE, a delay ACK timer associated with transmitting the at least one TCP ACK message, a quantity of data associated with the at least one TCP ACK message, one or more TCP parameters associated with the TCP at the UE, or a processing time associated the at least one TCP ACK message, or any combination thereof.

Additionally, or alternatively, the communications manager 820 may support wireless communication at a UE in accordance with examples as disclosed herein. The data packet component 835 may be configured as or otherwise support a means for receiving a first data packet including a first quantity of data and a second data packet including a second quantity of data, the first data packet associated with a first TCP ACK message and the second data packet associated with a second TCP ACK message. The TCP ACK segment component 840 may be configured as or otherwise support a means for generating a set of multiple TCP ACK message segments corresponding to the first TCP ACK message and the second TCP ACK message based on a threshold ACK size for TCP ACK message segments, where the set of multiple TCP ACK message segments correspond to feedback for the first quantity of data and the second quantity of data. In some examples, the TCP ACK segment component 840 may be configured as or otherwise support a means for transmitting the set of multiple TCP ACK message segments based on the generating.

In some examples, a TCP ACK message segment of the set of multiple TCP ACK message segments corresponds to feedback for a respective portion of a third quantity of data including the first quantity of data and the second quantity of data. In some examples, the first TCP ACK message and the second TCP ACK message include a SACK message. In some examples, a first set of TCP ACK message segment of the set of multiple TCP ACK message segments corresponds to feedback for a respective portion of the first quantity of data and a second set of TCP ACK message segments of the set of multiple TCP ACK message segments corresponds to feedback for a respective portion of the second quantity of data.

In some examples, generating the set of multiple TCP ACK message segments is further based on a downlink data pattern associated with downlink data packets for the UE and an uplink scheduling pattern associated with uplink data packets for the UE. In some examples, the parameter component 850 may be configured as or otherwise support a means for updating one or more parameters associated with the first data packet and the second data packet based on generating the set of multiple TCP ACK message segments, where transmitting the set of multiple TCP ACK message segments is based on the updating.

In some examples, to support generating the set of multiple TCP ACK message segments, the TCP ACK segment component 840 may be configured as or otherwise support a means for generating the set of multiple TCP ACK message segments based on a RAT associated with the UE, a throughput associated with downlink data packets for the UE, a time associated with layer two window management, or a discontinuous reception mode associated with the UE, or any combination thereof.

In some examples, to support generating the set of multiple TCP ACK message segments, the TCP ACK segment component 840 may be configured as or otherwise support a means for generating the set of multiple TCP ACK message segments based on a quantity of data streams associated with downlink data packets for the UE, a quantity of data streams associated with uplink data packets for the UE, one or more TCP parameters associated with a TCP at the UE, a transmit power associated with uplink data packets for the UE, or an uplink grant pattern associated with uplink data packets for the UE, or any combination thereof.

In some examples, to support generating the set of multiple TCP ACK message segments, the TCP ACK segment component 840 may be configured as or otherwise support a means for generating the set of multiple TCP ACK message segments based on an RTT associated with downlink data packets and uplink data packets for the UE, a PDB associated with downlink data packets for the UE, a PDB associated with uplink data packets for the UE, a QOS associated with downlink data packets for the UE, a QOS associated with uplink data packets for the UE, a traffic type associated with downlink data packets for the UE, or a traffic type associated with uplink data packets for the UE, or any combination thereof.

Additionally, or alternatively, the communications manager 820 may support wireless communication at a UE in accordance with examples as disclosed herein. In some examples, the TCP ACK component 830 may be configured as or otherwise support a means for generating at least one TCP ACK message associated with a quantity of data based on a transmission blanking pattern that indicates one or more time intervals associated with refrainment of transmission of TCP ACK messages, where a size of the at least one TCP ACK message is based on the transmission blanking pattern. The blanking pattern component 845 may be configured as or otherwise support a means for transmitting, based on the generating, the at least one TCP ACK message in accordance with the transmission blanking pattern.

In some examples, the data packet component 835 may be configured as or otherwise support a means for receiving a data packet including the quantity of data over a time interval of the one or more time intervals associated with refrainment of transmission of TCP ACK messages, where generating the at least one TCP ACK message is based on the time interval lapsing.

In some examples, the data packet component 835 may be configured as or otherwise support a means for receiving a data packet in response to the at least one TCP ACK message, where the data packet includes a second quantity of data, and where the second quantity of data is based on the size of the at least one TCP ACK message.

In some examples, the size of the at least one TCP ACK message is further based on a quantity of TCP ACK messages being buffered at the UE, a machine performance rating associated with the UE, a transmit power associated with uplink data packets for the UE, a quantity of available bandwidth in an uplink direction, a throughput associated with downlink data packets for the UE, or a burst associated with the downlink data packets for the UE, or any combination thereof. In some examples, the one or more time intervals are periodic or aperiodic. In some examples, the transmission blanking pattern is based on interference internal to the UE, interference external to the UE, coordinated interference, or informed interference, or any combination thereof.

Figure 9:
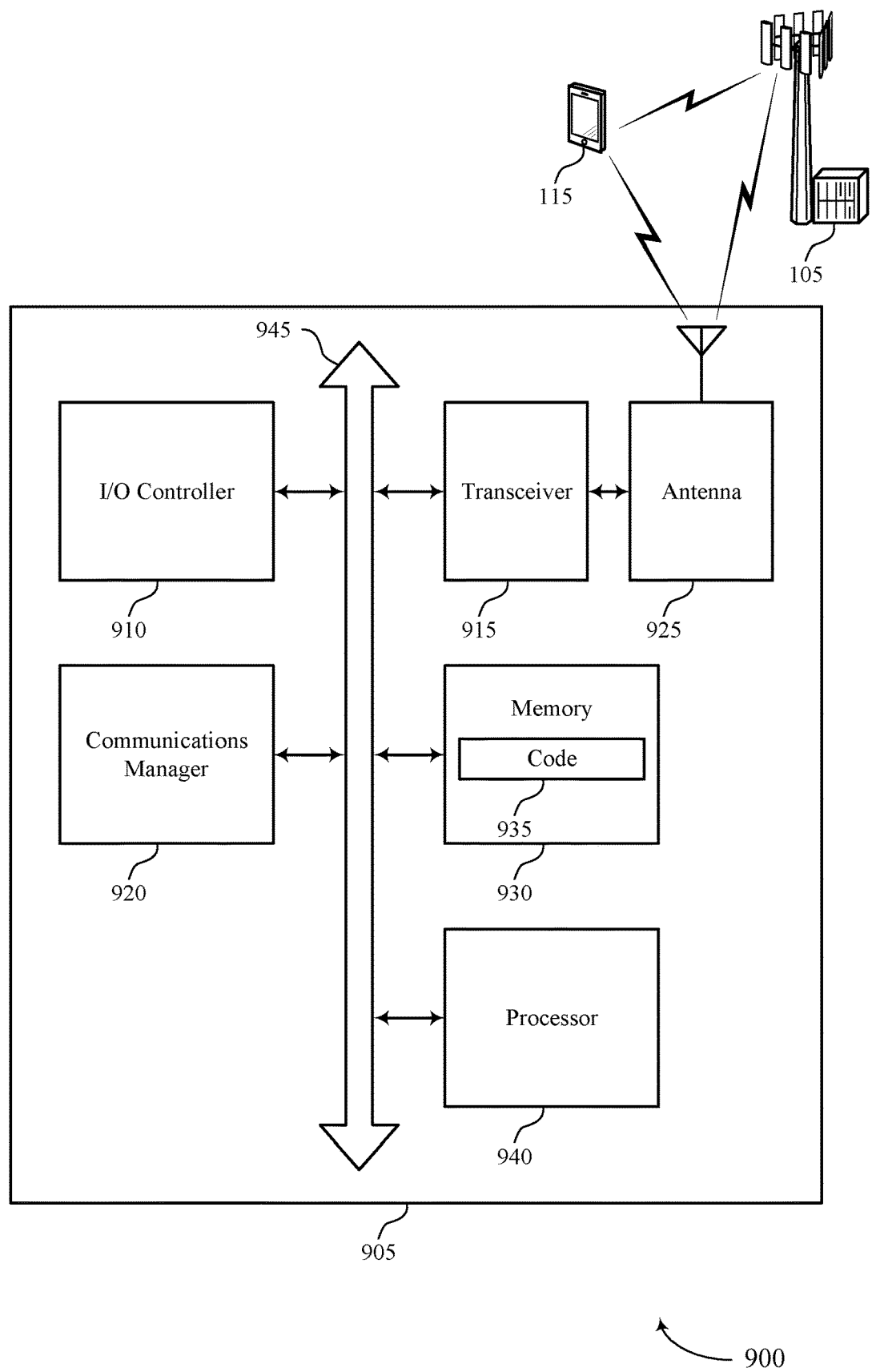
FIG. 9 shows a diagram of a system including a device that supports TCP ACK shaping in accordance with one or more aspects of the present disclosure.

FIG. 9 shows a diagram of a system 900 including a device 905 that supports TCP ACK shaping in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940.

These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting TCP ACK shaping). For example, the device 905 or a component of the device 905 may include a processor 940 and memory 930 coupled with or to the processor 940, the processor 940 and memory 930 configured to perform various functions described herein.

The communications manager 920 may support wireless communication at a UE (e.g., the device 905) in accordance with examples as disclosed herein. For example, the communications manager 920 may be configured as or otherwise support a means for generating at least one TCP ACK message in accordance with a delay timer and based on a threshold ACK size for TCP ACK messages. The communications manager 920 may be configured as or otherwise support a means for transmitting the at least one TCP ACK message based on the generating.

Additionally, or alternatively, the communications manager 920 may support wireless communication at a UE (e.g., the device 905) in accordance with examples as disclosed herein. For example, the communications manager 920 may be configured as or otherwise support a means for receiving a first data packet including a first quantity of data and a second data packet including a second quantity of data, the first data packet associated with a first TCP ACK message and the second data packet associated with a second TCP ACK message. The communications manager 920 may be configured as or otherwise support a means for generating a set of multiple TCP ACK message segments corresponding to the first TCP ACK message and the second TCP ACK message based on a threshold ACK size for TCP ACK message segments, where the set of multiple TCP ACK message segments correspond to feedback for the first quantity of data and the second quantity of data. The communications manager 920 may be configured as or otherwise support a means for transmitting the set of multiple TCP ACK message segments based on the generating.

Additionally, or alternatively, the communications manager 920 may support wireless communication at a UE (e.g., the device 905) in accordance with examples as disclosed herein. For example, the communications manager 920 may be configured as or otherwise support a means for generating at least one TCP ACK message associated with a quantity of data based on a transmission blanking pattern that indicates one or more time intervals associated with refrainment of transmission of TCP ACK messages, where a size of the at least one TCP ACK message is based on the transmission blanking pattern. The communications manager 920 may be configured as or otherwise support a means for transmitting, based on the generating, the at least one TCP ACK message in accordance with the transmission blanking pattern.

By including or configuring the communications manager 920 in accordance with examples as described herein, the device 905 may support techniques for improved user experience related to reduced processing, reduced power consumption, more efficient utilization of communication resources, and longer battery life.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of TCP ACK shaping as described herein, or the processor 940 and the memory 930 may be otherwise configured to perform or support such operations.

Figure 10:
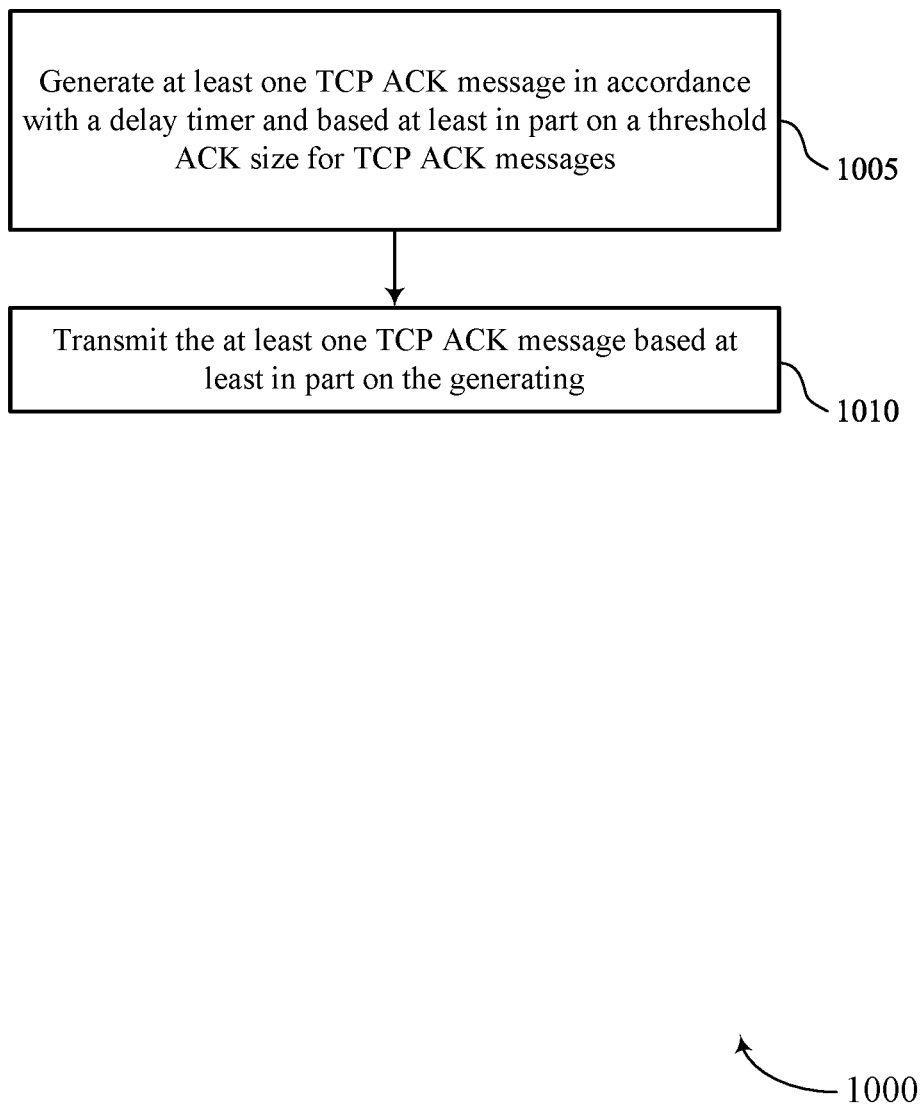
FIGS. 10 through 12 show flowcharts illustrating methods that support TCP ACK shaping in accordance with one or more aspects of the present disclosure.

FIG. 10 shows a flowchart illustrating a method 1000 that supports TCP ACK shaping in accordance with one or more aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include generating at least one TCP ACK message in accordance with a delay timer and based on a threshold ACK size for TCP ACK messages. The operations of 1005 may be performed in accordance with examples as disclosed herein. In some examples, aspects of the operations of 1005 may be performed by a delay timer component 825 as described with reference to FIG. 8.

At 1010, the method may include transmitting the at least one TCP ACK message based on the generating. The operations of 1010 may be performed in accordance with examples as disclosed herein. In some examples, aspects of the operations of 1010 may be performed by a TCP ACK component 830 as described with reference to FIG. 8.

Figure 11:
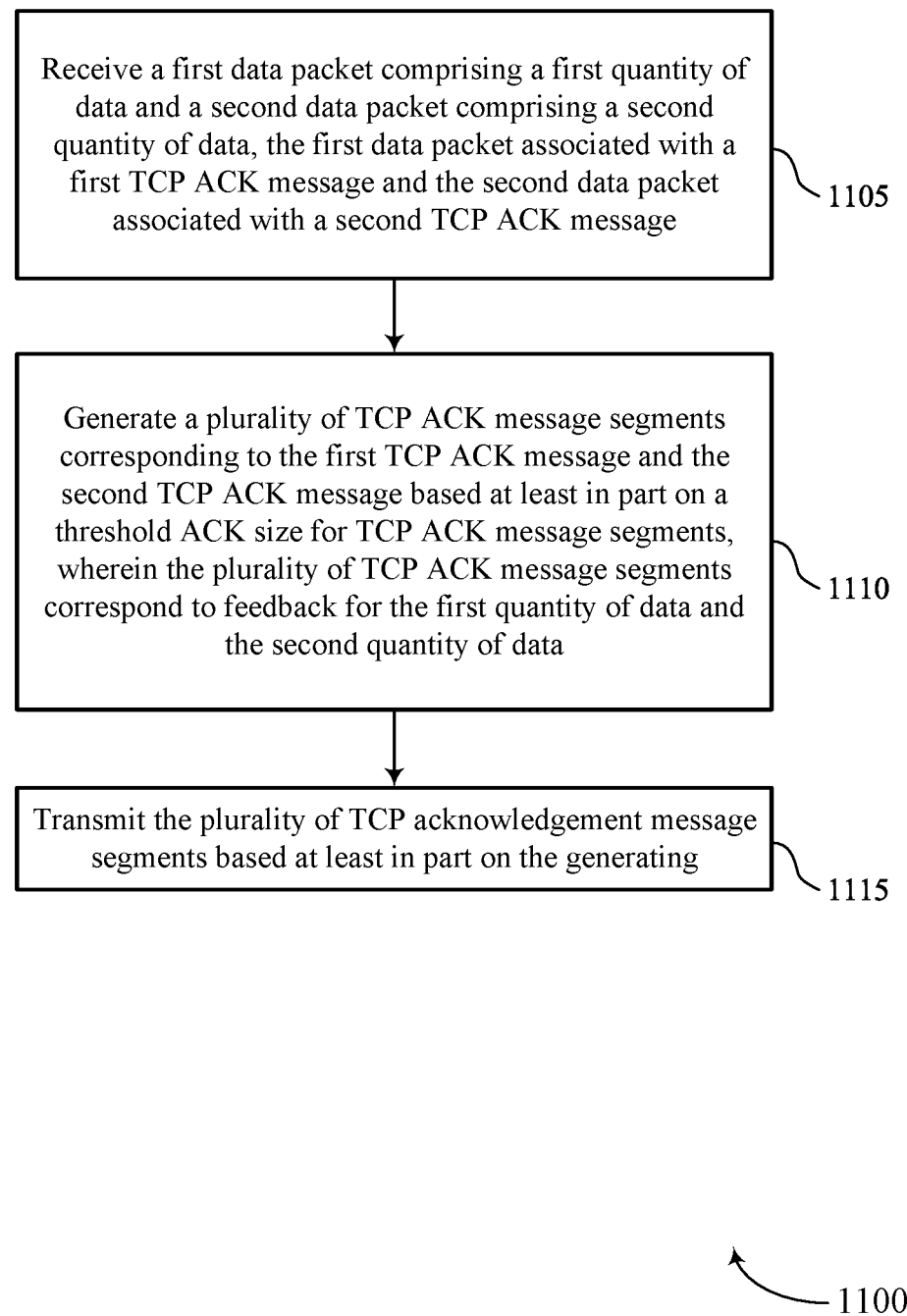

FIG. 11 shows a flowchart illustrating a method 1100 that supports TCP ACK shaping in accordance with one or more aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include receiving a first data packet including a first quantity of data and a second data packet including a second quantity of data, the first data packet associated with a first TCP ACK message and the second data packet associated with a second TCP ACK message. The operations of 1105 may be performed in accordance with examples as disclosed herein. In some examples, aspects of the operations of 1105 may be performed by a data packet component 835 as described with reference to FIG. 8.

At 1110, the method may include generating a set of multiple TCP ACK message segments corresponding to the first TCP ACK message and the second TCP ACK message based on a threshold ACK size for TCP ACK message segments, where the set of multiple TCP ACK message segments correspond to feedback for the first quantity of data and the second quantity of data. The operations of 1110 may be performed in accordance with examples as disclosed herein. In some examples, aspects of the operations of 1110 may be performed by a TCP ACK segment component 840 as described with reference to FIG. 8.

At 1115, the method may include transmitting the set of multiple TCP ACK message segments based on the generating. The operations of 1115 may be performed in accordance with examples as disclosed herein. In some examples, aspects of the operations of 1115 may be performed by a TCP ACK segment component 840 as described with reference to FIG. 8.

Figure 12:
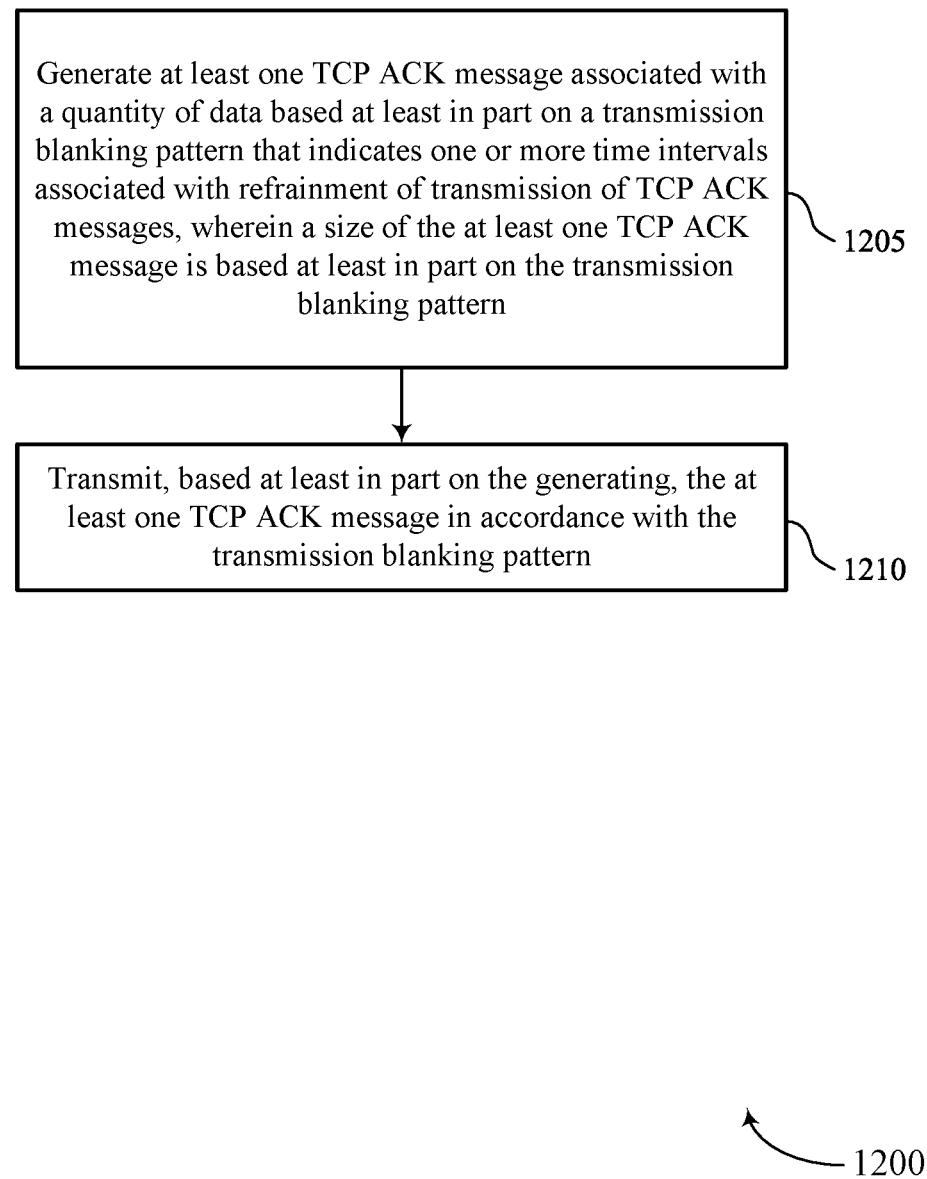

FIG. 12 shows a flowchart illustrating a method 1200 that supports TCP ACK shaping in accordance with one or more aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1205, the method may include generating at least one TCP ACK message associated with a quantity of data based on a transmission blanking pattern that indicates one or more time intervals associated with refrainment of transmission of TCP ACK messages, where a size of the at least one TCP ACK message is based on the transmission blanking pattern. The operations of 1205 may be performed in accordance with examples as disclosed herein. In some examples, aspects of the operations of 1205 may be performed by a TCP ACK component 830 as described with reference to FIG. 8.

At 1210, the method may include transmitting, based on the generating, the at least one TCP ACK message in accordance with the transmission blanking pattern. The operations of 1210 may be performed in accordance with examples as disclosed herein. In some examples, aspects of the operations of 1210 may be performed by a blanking pattern component 845 as described with reference to FIG. 8.

The following provides an overview of aspects of the present disclosure:

Aspect 1: A method for wireless communication at a UE, comprising: generating at least one TCP ACK message in accordance with a delay timer and based at least in part on a threshold ACK size for TCP ACK messages; and transmitting the at least one TCP ACK message based at least in part on the generating.

Aspect 2: The method of aspect 1, wherein a duration for the delay timer is based at least in part on a downlink data pattern associated with downlink data packets for the UE and an uplink scheduling pattern associated with uplink data packets for the UE.

Aspect 3: The method of any of aspects 1 through 2, wherein generating the at least one TCP ACK message in accordance with the delay timer comprises: generating the at least one TCP ACK message in response to an expiration of a duration for the delay timer, wherein the at least one TCP ACK message is transmitted after the expiration of the duration of the delay timer.

Aspect 4: The method of any of aspects 1 through 3, wherein generating the at least one TCP ACK message in accordance with the delay timer comprises: generating the at least one TCP ACK message based at least in part on a quantity of TCP ACK messages in a buffer of the UE.

Aspect 5: The method of any of aspects 1 through 4, further comprising: determining a duration for the delay timer based at least in part on a RTT associated with a TCP at the UE, a time duration for receiving data packets at the UE, a delay ACK timer associated with transmitting the at least one TCP ACK message, a quantity of data associated with the at least one TCP ACK message, one or more TCP parameters associated with the TCP at the UE, or a processing time associated the at least one TCP ACK message, or any combination thereof.

Aspect 6: A method for wireless communication at a UE, comprising: receiving a first data packet comprising a first quantity of data and a second data packet comprising a second quantity of data, the first data packet associated with a first TCP ACK message and the second data packet associated with a second TCP ACK message; generating a plurality of TCP ACK message segments corresponding to the first TCP ACK message and the second TCP ACK message based at least in part on a threshold ACK size for TCP ACK message segments, wherein the plurality of TCP ACK message segments correspond to feedback for the first quantity of data and the second quantity of data; and transmitting the plurality of TCP ACK message segments based at least in part on the generating.

Aspect 7: The method of aspect 6, wherein a TCP ACK message segment of the plurality of TCP ACK message segments corresponds to feedback for a respective portion of a third quantity of data including the first quantity of data and the second quantity of data.

Aspect 8: The method of any of aspects 6 through 7, wherein the first TCP ACK message and the second TCP ACK message comprise selective ACK message.

Aspect 9: The method of any of aspects 6 through 8, wherein a first set of TCP ACK message segment of the plurality of TCP ACK message segments corresponds to feedback for a respective portion of the first quantity of data and a second set of TCP ACK message segments of the plurality of TCP ACK message segments corresponds to feedback for a respective portion of the second quantity of data.

Aspect 10: The method of any of aspects 6 through 9, wherein generating the plurality of TCP ACK message segments is further based at least in part on a downlink data pattern associated with downlink data packets for the UE and an uplink scheduling pattern associated with uplink data packets for the UE.

Aspect 11: The method of any of aspects 6 through 10, further comprising: updating one or more parameters associated with the first data packet and the second data packet based at least in part on generating the plurality of TCP ACK message segments, wherein transmitting the plurality of TCP ACK message segments is based at least in part on the updating.

Aspect 12: The method of any of aspects 6 through 11, wherein generating the plurality of TCP ACK message segments comprises: generating the plurality of TCP ACK message segments based at least in part on a RAT associated with the UE, a throughput associated with downlink data packets for the UE, a time associated with layer two window management, or a discontinuous reception mode associated with the UE, or any combination thereof.

Aspect 13: The method of any of aspects 6 through 12, wherein generating the plurality of TCP ACK message segments comprises: generating the plurality of TCP ACK message segments based at least in part on a quantity of data streams associated with downlink data packets for the UE, a quantity of data streams associated with uplink data packets for the UE, one or more TCP parameters associated with a TCP at the UE, a transmit power associated with uplink data packets for the UE, or an uplink grant pattern associated with uplink data packets for the UE, or any combination thereof.

Aspect 14: The method of any of aspects 6 through 13, wherein generating the plurality of TCP ACK message segments comprises: generating the plurality of TCP ACK message segments based at least in part on a RTT associated with downlink data packets and uplink data packets for the UE, a PDB associated with downlink data packets for the UE, a PDB associated with uplink data packets for the UE, a QOS associated with downlink data packets for the UE, a QOS associated with uplink data packets for the UE, a traffic type associated with downlink data packets for the UE, or a traffic type associated with uplink data packets for the UE, or any combination thereof.

Aspect 15: A method for wireless communication at a UE, comprising: generating at least one TCP ACK message associated with a quantity of data based at least in part on a transmission blanking pattern that indicates one or more time intervals associated with refrainment of transmission of TCP ACK messages, wherein a size of the at least one TCP ACK message is based at least in part on the transmission blanking pattern; and transmitting, based at least in part on the generating, the at least one TCP ACK message in accordance with the transmission blanking pattern.

Aspect 16: The method of aspect 15, further comprising: receiving a data packet comprising the quantity of data over a time interval of the one or more time intervals associated with refrainment of transmission of TCP ACK messages, wherein generating the at least one TCP ACK message is based at least in part on the time interval lapsing.

Aspect 17: The method of any of aspects 15 through 16, further comprising: receiving a data packet in response to the at least one TCP ACK message, wherein the data packet comprises a second quantity of data, and wherein the second quantity of data is based at least in part on the size of the at least one TCP ACK message.

Aspect 18: The method of any of aspects 15 through 17, wherein the size of the at least one TCP ACK message is further based at least in part on a quantity of TCP ACK messages being buffered at the UE, a machine performance rating associated with the UE, a transmit power associated with uplink data packets for the UE, a quantity of available bandwidth in an uplink direction, a throughput associated with downlink data packets for the UE, or a burst associated with the downlink data packets for the UE, or any combination thereof.

Aspect 19: The method of any of aspects 15 through 18, wherein the one or more time intervals are periodic or aperiodic.

Aspect 20: The method of any of aspects 15 through 19, wherein the transmission blanking pattern is based at least in part on interference internal to the UE, interference external to the UE, coordinated interference, or informed interference, or any combination thereof.

Aspect 21: An apparatus for wireless communication at a UE, comprising a processor; memory coupled with the processor; and one or more instructions stored in the memory and executable by the processor to cause the apparatus to, based at least in part on the one or more instructions, perform a method of any of aspects 1 through 5.

Aspect 22: An apparatus for wireless communication at a UE, comprising at least one means for performing a method of any of aspects 1 through 5.

Aspect 23: A non-transitory computer-readable medium storing code for wireless communication at a UE, the code comprising instructions executable by a processor to perform a method of any of aspects 1 through 5.

Aspect 24: An apparatus for wireless communication at a UE, comprising a processor; memory coupled with the processor; and one or more instructions stored in the memory and executable by the processor to cause the apparatus to, based at least in part on the one or more instructions, perform a method of any of aspects 6 through 14.

Aspect 25: An apparatus for wireless communication at a UE, comprising at least one means for performing a method of any of aspects 6 through 14.

Aspect 26: A non-transitory computer-readable medium storing code for wireless communication at a UE, the code comprising instructions executable by a processor to perform a method of any of aspects 6 through 14.

Aspect 27: An apparatus for wireless communication at a UE, comprising a processor; memory coupled with the processor; and one or more instructions stored in the memory and executable by the processor to cause the apparatus to, based at least in part on the one or more instructions, perform a method of any of aspects 15 through 20.

Aspect 28: An apparatus for wireless communication at a UE, comprising at least one means for performing a method of any of aspects 15 through 20.

Aspect 29: A non-transitory computer-readable medium storing code for wireless communication at a UE, the code comprising instructions executable by a processor to perform a method of any of aspects 15 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving a first data packet comprising a first quantity of data and a second data packet comprising a second quantity of data;
   generating a first transmission control protocol (TCP) acknowledgement message based at least in part on the first data packet and a second TCP acknowledgement message based at least in part on the second data packet;
   generating a plurality of TCP acknowledgement message segments corresponding to the first TCP acknowledgement message and the second TCP acknowledgement message based at least in part on a threshold acknowledgement size for TCP acknowledgement message segments, on a downlink scheduling pattern associated with downlink data packets for the UE, and on an uplink scheduling pattern associated with uplink data packets for the UE, wherein the plurality of TCP acknowledgement message segments correspond to feedback for the first quantity of data and the second quantity of data; and
   transmitting the plurality of TCP acknowledgement message segments based at least in part on the generating.

2. The method of claim 1, wherein a TCP acknowledgement message segment of the plurality of TCP acknowledgement message segments corresponds to feedback for a respective portion of a third quantity of data including the first quantity of data and the second quantity of data.

3. The method of claim 1, wherein the first TCP acknowledgement message and the second TCP acknowledgement message comprise selective acknowledgement messages.

4. The method of claim 1, wherein a first set of TCP acknowledgement message segment of the plurality of TCP acknowledgement message segments corresponds to feedback for a respective portion of the first quantity of data and a second set of TCP acknowledgement message segments of the plurality of TCP acknowledgement message segments corresponds to feedback for a respective portion of the second quantity of data.

5. The method of claim 1, further comprising:
updating one or more parameters associated with the first data packet and the second data packet based at least in part on generating the plurality of TCP acknowledgement message segments, wherein transmitting the plurality of TCP acknowledgement message segments is based at least in part on the updating.

6. The method of claim 1, wherein generating the plurality of TCP acknowledgement message segments comprises:
generating the plurality of TCP acknowledgement message segments based at least in part on a radio access technology associated with the UE, a throughput associated with downlink data packets for the UE, a time associated with layer two window management, or a discontinuous reception mode associated with the UE, or any combination thereof.

7. The method of claim 1, wherein generating the plurality of TCP acknowledgement message segments comprises:
generating the plurality of TCP acknowledgement message segments based at least in part on a quantity of data streams associated with downlink data packets for the UE, a quantity of data streams associated with uplink data packets for the UE, one or more TCP parameters associated with a TCP at the UE, a transmit power associated with uplink data packets for the UE, or an uplink grant pattern associated with uplink data packets for the UE, or any combination thereof.

8. The method of claim 1, wherein generating the plurality of TCP acknowledgement message segments comprises:
generating the plurality of TCP acknowledgement message segments based at least in part on a round trip time associated with downlink data packets and uplink data packets for the UE, a packet delay budget associated with downlink data packets for the UE, a packet delay budget associated with uplink data packets for the UE, a quality of service associated with downlink data packets for the UE, a quality of service associated with uplink data packets for the UE, a traffic type associated with downlink data packets for the UE, or a traffic type associated with uplink data packets for the UE, or any combination thereof.

9. An apparatus for wireless communication at a user equipment (UE), comprising:
one or more processors;
one or more memories coupled with the one or more processors; and
one or more instructions stored in the one or more memories and executable by the one or more processors to cause the apparatus to, based at least in part on the one or more instructions:
receive a first data packet comprising a first quantity of data and a second data packet comprising a second quantity of data;
generate a first transmission control protocol (TCP) acknowledgement message based at least in part on the first data packet and a second TCP acknowledgement message based at least in part on the second data packet;
generate a plurality of TCP acknowledgement message segments corresponding to the first TCP acknowledgement message and the second TCP acknowledgement message based at least in part on a threshold acknowledgement size for TCP acknowledgement message segments, on a downlink scheduling pattern associated with downlink data packets for the UE, and on an uplink scheduling pattern associated with uplink data packets for the UE, wherein the plurality of TCP acknowledgement message segments correspond to feedback for the first quantity of data and the second quantity of data; and
transmit the plurality of TCP acknowledgement message segments based at least in part on the generating.

10. The apparatus of claim 9, wherein a TCP acknowledgement message segment of the plurality of TCP acknowledgement message segments corresponds to feedback for a respective portion of a third quantity of data including the first quantity of data and the second quantity of data.

11. The apparatus of claim 9, wherein the first TCP acknowledgement message and the second TCP acknowledgement message comprise selective acknowledgement messages.

12. The apparatus of claim 9, wherein a first set of TCP acknowledgement message segment of the plurality of TCP acknowledgement message segments corresponds to feedback for a respective portion of the first quantity of data and a second set of TCP acknowledgement message segments of the plurality of TCP acknowledgement message segments corresponds to feedback for a respective portion of the second quantity of data.

13. The apparatus of claim 9, wherein the one or more instructions are further executable by the one or more processors to cause the apparatus to, based at least in part on the one or more instructions:
update one or more parameters associated with the first data packet and the second data packet based at least in part on generating the plurality of TCP acknowledgement message segments, wherein transmitting the plurality of TCP acknowledgement message segments is based at least in part on the updating.

14. The apparatus of claim 9, wherein the one or more instructions to generate the plurality of TCP acknowledgement message segments are executable by the one or more processors to cause the apparatus to, based at least in part on the one or more instructions:
generate the plurality of TCP acknowledgement message segments based at least in part on a radio access technology associated with the UE, a throughput associated with downlink data packets for the UE, a time associated with layer two window management, or a discontinuous reception mode associated with the UE, or any combination thereof.

15. The apparatus of claim 9, wherein the one or more instructions to generate the plurality of TCP acknowledgement message segments are executable by the one or more processors to cause the apparatus to, based at least in part on the one or more instructions:
generate the plurality of TCP acknowledgement message segments based at least in part on a quantity of data streams associated with downlink data packets for the UE, a quantity of data streams associated with uplink data packets for the UE, one or more TCP parameters associated with a TCP at the UE, a transmit power associated with uplink data packets for the UE, or an uplink grant pattern associated with uplink data packets for the UE, or any combination thereof.

16. The apparatus of claim 9, wherein the one or more instructions to generate the plurality of TCP acknowledgement message segments are executable by the one or more processors to cause the apparatus to, based at least in part on the one or more instructions:
generate the plurality of TCP acknowledgement message segments based at least in part on a round trip time associated with downlink data packets and uplink data packets for the UE, a packet delay budget associated with downlink data packets for the UE, a packet delay budget associated with uplink data packets for the UE, a quality of service associated with downlink data packets for the UE, a quality of service associated with uplink data packets for the UE, a traffic type associated with downlink data packets for the UE, or a traffic type associated with uplink data packets for the UE, or any combination thereof.

* * * * *